United States Patent
Sasaki

(10) Patent No.: US 8,831,441 B2
(45) Date of Patent: Sep. 9, 2014

(54) OPTICAL COMMUNICATION SYSTEM, OPTICAL RECEIVER, OPTICAL TRANSPONDER, WAVELENGTH MULTIPLEXING OPTICAL COMMUNICATION SYSTEM, WAVELENGTH MULTIPLEXING RECEIVING DEVICE, AND WAVELENGTH MULTIPLEXING OPTICAL TRANSPONDER

(75) Inventor: Shinya Sasaki, Sapporo (JP)

(73) Assignee: Hitachi, Ltd., Tokyo (JP)

( * ) Notice: Subject to any disclaimer, the term of this patent is extended or adjusted under 35 U.S.C. 154(b) by 99 days.

(21) Appl. No.: 13/701,198

(22) PCT Filed: Jun. 3, 2010

(86) PCT No.: PCT/JP2010/059463

§ 371 (c)(1),
(2), (4) Date: Nov. 30, 2012

(87) PCT Pub. No.: WO2011/151913

PCT Pub. Date: Dec. 8, 2011

(65) Prior Publication Data

US 2013/0071122 A1 Mar. 21, 2013

(51) Int. Cl.
*H04B 10/60* (2013.01)
*H04J 14/02* (2006.01)

(52) U.S. Cl.
USPC .............................. 398/202; 398/76; 398/79

(58) Field of Classification Search
CPC .... H04B 10/614; H04B 10/611; H04B 10/61; H04B 10/548; H04B 10/66; H04B 10/695; H04B 10/69; H04B 10/60; H04J 14/06; H04J 14/002; H04J 14/0298; H04J 14/02; H04L 27/2697

USPC ...................................... 398/76, 79, 202–215
See application file for complete search history.

(56) References Cited

U.S. PATENT DOCUMENTS 7,200,344 B1 * 4/2007 Hoshida ........................ 398/202
7,450,863 B2 * 11/2008 Winzer ......................... 398/204
(Continued)

FOREIGN PATENT DOCUMENTS

JP 11-331089 A 11/1999
JP 2008-135992 A 6/2008
(Continued)

OTHER PUBLICATIONS

Han et al., "An Overview of Peak-to-Average Power Ratio Reduction Techniques for Multicarrier Transmission," IEEE Wireless Communications, Apr. 2005, pp. 56-65.

(Continued)

*Primary Examiner* — Ken Vanderpuye
*Assistant Examiner* — Dibson Sanchez
(74) *Attorney, Agent, or Firm* — Foley & Lardner LLP

(57) ABSTRACT

To reduce PAPR in an optical OFDM communication system, light is phase-modulated by a base-band OFDM signal which is the output of a transmission signal processing unit 100 provided in an inner section of an optical receiver. When optical communication is implemented with the light as signal light, PAPR of low level of almost 0 dB can be achieved at places in an inner section of an optical fiber wherein the optical power is large. The signal light is propagated along an optical fiber which is a transmission path, the light is passed through a delay interferometer, and converted to electrical signals by two optical receivers. Each of the two electrical signals is converted to a subcarrier by FFT signal processing and an AD converter disposed in an inner section of the optical receivers, then, subcarriers having the same frequency are subtracted and decoded, and data is regenerated.

15 Claims, 13 Drawing Sheets

(56) References Cited

U.S. PATENT DOCUMENTS

| | | | |
|---|---|---|---|
| 7,477,852 B2 * | 1/2009 | Agarwal et al. | 398/210 |
| 7,693,429 B1 * | 4/2010 | Lowery | 398/192 |
| 7,720,175 B2 * | 5/2010 | Yeon et al. | 375/297 |
| 7,860,394 B2 * | 12/2010 | Hoshida | 398/74 |
| 7,949,260 B2 * | 5/2011 | Fukuchi | 398/202 |
| 8,064,767 B2 * | 11/2011 | Shpantzer et al. | 398/192 |
| 8,107,817 B2 * | 1/2012 | Lin et al. | 398/81 |
| 8,107,826 B2 * | 1/2012 | Armstrong et al. | 398/193 |
| 8,111,993 B2 * | 2/2012 | Lowery et al. | 398/81 |
| 8,112,001 B2 * | 2/2012 | Lowery et al. | 398/158 |
| 8,121,494 B2 * | 2/2012 | Andrew et al. | 398/202 |
| 8,135,279 B2 * | 3/2012 | Mertz | 398/76 |
| 8,145,072 B2 * | 3/2012 | Akiyama et al. | 398/213 |
| 8,184,993 B2 * | 5/2012 | Djordjevic et al. | 398/205 |
| 8,204,377 B2 * | 6/2012 | Liu et al. | 398/65 |
| 8,218,979 B2 * | 7/2012 | Liu | 398/208 |
| 8,233,799 B2 * | 7/2012 | Lowery | 398/76 |
| 8,320,779 B2 * | 11/2012 | Fukuchi et al. | 398/212 |
| 8,478,138 B2 * | 7/2013 | Sugawara et al. | 398/210 |
| 8,611,751 B2 * | 12/2013 | Liu et al. | 398/98 |
| 8,693,459 B2 * | 4/2014 | Youn et al. | 370/350 |
| 2002/0033987 A1 | 3/2002 | Fuse et al. | |
| 2004/0132315 A1 * | 7/2004 | Chambers et al. | 438/763 |
| 2008/0019463 A1 * | 1/2008 | Ikeuchi et al. | 375/331 |
| 2009/0034967 A1 * | 2/2009 | Tao et al. | 398/33 |
| 2009/0324226 A1 * | 12/2009 | Buchali et al. | 398/76 |
| 2010/0027994 A1 | 2/2010 | Xu et al. | |
| 2010/0150568 A1 * | 6/2010 | Lee et al. | 398/137 |

FOREIGN PATENT DOCUMENTS

| | | |
|---|---|---|
| JP | 2008-211713 A | 9/2008 |
| JP | 2009-512285 A | 3/2009 |
| JP | 2009-188509 A | 8/2009 |
| JP | 2009-188510 A | 8/2009 |
| JP | 2010-041706 A | 2/2010 |
| WO | WO 2007/041799 A2 | 4/2007 |

OTHER PUBLICATIONS

Thompson et al., "Constant Envelope OFDM," IEEE Transactions on Communications, Aug. 2008, pp. 1300-1312, vol. 56, No. 8.

Goebel et al., "PAPR Reduction Techniques for Coherent Optical OFDM Transmission," IEEE, ICTON, 2009, Mo.B2.4, pp. 1-4.

Buchali et al., "Nonlinear limits for high bit-rate O-OFDM systems," IEEE Summer Topical, 2009, MC4.2, pp. 83-84.

Schmidt et al., "Experimental Demonstrations of Electronic Dispersion Compensation for Long-Haul Transmission Using Direct-Detection Optical OFDM," 2008, J. Lightwave Technology, pp. 196-203, vol. 26, No. 1.

PCT International Search Report, PCT/JP2010/059463, dated Aug. 10, 2010, 1 page.

* cited by examiner

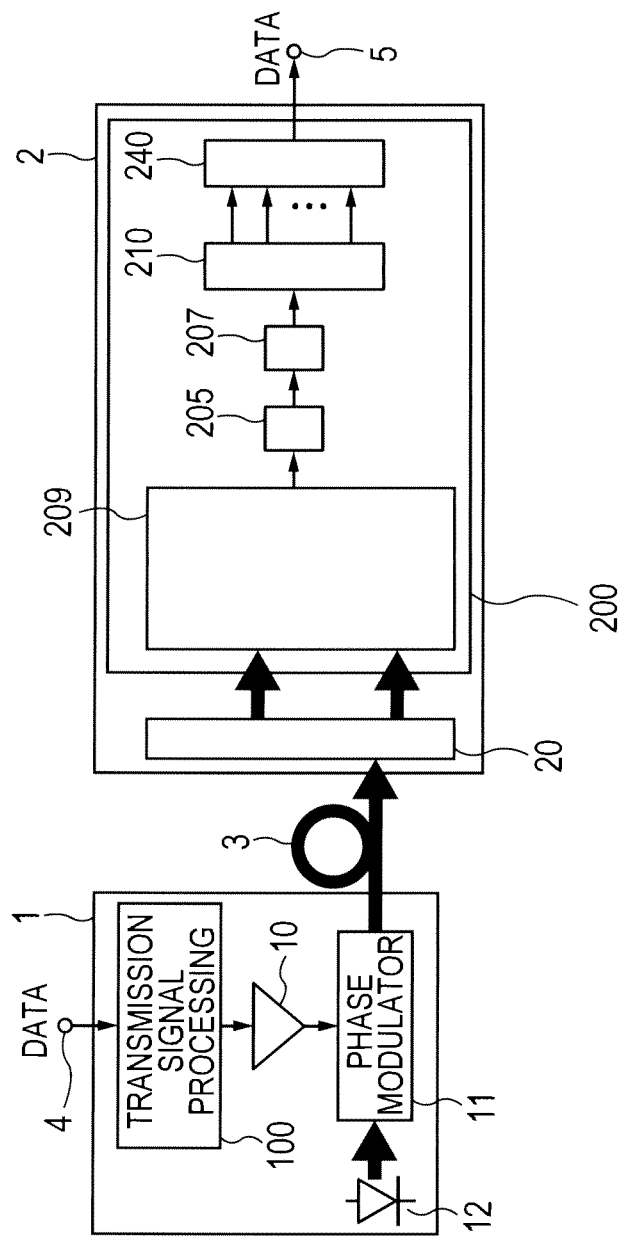

OPTICAL COMMUNICATION SYSTEM, OPTICAL RECEIVER, OPTICAL TRANSPONDER, WAVELENGTH MULTIPLEXING OPTICAL COMMUNICATION SYSTEM, WAVELENGTH MULTIPLEXING RECEIVING DEVICE, AND WAVELENGTH MULTIPLEXING OPTICAL TRANSPONDER

TECHNICAL FIELD

The present invention relates to optical OFDM communication systems, optical receivers, optical transponders, wavelength multiplexing optical communication systems, wavelength multiplexing receiving devices, and multiplexing optical transponders, and more particularly, relates to an optical communication system and the like that utilize multicarriers. To put it more concretely, the present invention relates to an optical communication system and the like that reduce a PAPR (peak-to-average power ratio) in an optical OFDM (orthogonal frequency division multiplexing) communication system.

BACKGROUND ART

Optical communication systems that have been put into practice so far utilize binary modulation/demodulation techniques with the use of optical intensity. To put it concretely, "0" and "1" of a digital information signal are converted to on-off of the optical intensity of light on a sending side, and fed into an optical fiber, and the light that is propagated along the optical fiber is received on a receiving side and photoelectrically converted to the original digital information signal. In recent years, along with the explosive growth of the Internet, communication capacity required of an optical communication system has been dramatically increased. Measures to cope with the need for vast expansion of the communication capacity by increasing the speed of on-off of the optical intensity, that is, modulation speed, have been taken so far. However, these measures in which it is intended to drastically increase the communication capacity by increasing the modulation speed have the following problem.

There is a problem in that, if the modulation speed is increased, a transmission distance is limited by the chromatic dispersion of an optical fiber. In general, a transmission distance limited by the chromatic dispersion of the optical fiber is shortened in inverse proportion to the square value of the bit rate. In other words, if the bit rate doubles, the transmission distance limited by the chromatic dispersion becomes one fourth. In addition, there is another problem in that, if the modulation speed is increased, a transmission distance is limited by the polarization mode dispersion of the optical fiber. In general, if the bit rate doubles, the transmission distance limited by the polarization mode dispersion is halved. To explain the influence of the chromatic dispersion concretely, if a fiber with a normal chromatic dispersion is used at a bit rate of 10 Gbps, a transmission distance limited by the chromatic dispersion is 60 km, but if the same fiber is used at a bit rate of 40 Gbps, the transmission distance becomes about 4 km. In addition, if the same fiber is used in the next-generation 100 Gbps system, the transmission distance limited by the chromatic dispersion becomes 0.6 km, hence a trunkline optical communication system having a transmission distance about 500 km can not be brought into reality with the use of the same fiber as it is. In order to build an ultrahigh-speed trunkline optical communication system, a special optical fiber that has a negative dispersion characteristic to cancel the chromatic dispersion of a transmission path, a so-called dispersion compensation fiber, is currently installed in transponders and transceivers. This special fiber is expensive, and a sophisticated design is needed to determine the amounts of dispersion compensation fibers respectively installed in the transceivers and the optical transponders, which leads to an advance on the cost of the optical communication system.

Therefore, recently, an optical communication system, which utilizes an OFDM technique as an optical modulation/demodulation technique that can provide large communication capacity, has been researched and developed while getting a lot of attention. The OFDM technique is a technique in which the following processing is performed. First, by respectively setting the amplitudes and phases of a lot of sine-waves that are orthogonal to each other, that is, a lot of sine-waves whose frequencies are integral multiples of the reciprocal of one symbol time (these sine-waves are referred to as subcarriers hereinafter), to be predetermined values in the one symbol time, information is superimposed onto the subcarriers (in other words, the subcarriers are modulated). Next, a carrier is modulated by a signal that bundles the above subcarriers, and the modulated carrier is sent out. This OFDM technique has already put into practice in VDSL (very high bit rate digital subscriber line) systems used for communication between telephone exchange stations and households, power line communication systems used in households, and digital terrestrial television systems. In addition, this OFDM technique is slated to be used for the next-generation mobile network system.

The optical OFDM communication system is a communication system in which the OFDM technique is applied to light that is used as a carrier. In the OFDM technique, a lot of subcarriers are used as described above, and on top of that, multilevel modulation methods such as 4-QAM, 8-PSK, or 16-QAM can be applied to modulation methods for individual subcarriers, hence one symbol time becomes much longer than the reciprocal of the bit rate. As a result, the transmission distance limited by the above-described chromatic dispersion and the polarization mode dispersion becomes much longer than a transmission distance expected in the optical communication system (for example, much longer than 500 km in a domestic trunkline system), hence the above-described dispersion compensation fibers become unnecessary. Therefore, there is a possibility that a low-cost optical communication system is brought into reality.

FIG. 17 is a block diagram of an existing optical OFDM communication system with the use of a direct detection formats.

An optical transmitter 500 and a direct detection optical receiver 600 are connected via an optical fiber 3. When data to be fundamentally communicated are input to the optical transmitter 500 via an input terminal 4, the data are converted to a base-band OFDM signal by a transmission signal processing unit 100 in the optical transmitter 500, and this base-band OFDM signal is amplified by an driver amplifier 10. An optical modulator 501 performs field modulation or intensity modulation on light emitted from a laser 12 with this signal to generate modulated light. This optical OFDM signal reaches the direct detection optical receiver 600 via the optical fiber 3 which is a transmission path. The optical OFDM signal is directly detected and received by a photodiode 201, and converted to an electrical signal. This electrical signal is ideally equal to the above-described base-band OFDM signal, and this signal is amplified by a preamplifier 202, and the amplified signal is converted to digital signals by an AD converter 206. The digital signals output from the AD converter 206 are converted to subcarriers by a reception signal pre-processing unit 220. Subsequently, the subcarriers are demodulated into data to be fundamentally communicated by a reception signal post-processing unit 240, and output from a terminal 5.

FIG. 2 is a functional block diagram of the transmission signal processing unit 100. FIG. 3 is a functional block diagram of the reception signal pre-processing unit 220. FIG. 4 is a functional block diagram of the reception signal post-processing unit 240.

First, data to be transmitted are converted to 2N parallel data by a serial-parallel (S/P) converter 110, where N is the number of subcarriers onto which data are superimposed, and 2N is the number of the parallel data. Although, if the subcarriers are modulated by 4-QAM, the number of the parallel data is 2N, if the subcarriers are modulated by 16-QAM, the number of the parallel data becomes 4N. In other words, serial data are converted to parallel data the number of which is "the bit number of one symbol multiplied by the number of subcarriers". A subcarrier modulation unit 120 modulates the N subcarriers with these parallel data. These modulated subcarriers are converted to data along a time axis by an inverse FFT (inverse fast Fourier transform) unit 130, and the data are converted to serial data by a parallel-serial (P/S) converter 140. These serial data pass through a digital-analog (D/A) converter 150, and they are sent out to the driver amplifier as analog signals.

At the reception signal pre-processing unit 220, the digitalized electrical reception signals are converted to N parallel data by a serial-parallel (S/P) converter 212. These parallel data are divided into N subcarrier signals at an FFT (fast Fourier transform) unit 213. At the reception signal post-processing unit 240, the data superimposed on the subcarriers are demodulated by a subcarrier demodulation unit 241, and the modulated data are converted to serial data by a parallel-serial (P/S) converter 242, and sent out as information data.

Both in an optical communication system and in a wireless communication system, the fact that a PAPR (peak-to-average power ratio) is large causes a problem. In the case of the wireless communication system, if the linearity of a power amplifier that drives a transmission antenna is inferior, signals are distorted at a peak power, which leads to receiver sensitivity degradation, or interference in adjacent channels owing to the spread of the signal spectra.

In the optical communication system, there is a problem that is caused by a large PAPR and unique to an communication using optical fibers. This problem does not exist in the wireless communication system. It is a phenomenon called a nonlinear phase rotation, in which, at the time when a peak power is large, the phase of light rotates more than the phases of light at other times. This phenomenon occurs owing to the fact that an optical fiber which is a transmission path shows a weak nonlinearity. A nonlinear optical effect, so-called Kerr effect is given by the next expression.

[Expression 1]

$$\phi(t) = \phi_0 + \phi_{NL}(t) = \phi_0 + \frac{\gamma}{\alpha} \cdot P(t) = \phi_0 + \frac{\gamma}{\alpha} \cdot P_{ave} \cdot PAPR(t)$$

where $\phi(t)$ is the instant phase of light; $\phi_o$ is the linear phase; $\phi_{NL}$ is the nonlinear phase; $\gamma$ is the non linear constant of optical fiber; $\alpha$ is the loss factor of optical fiber; P (t) is the optical power; $P_{ave}$ is the average optical power; and PAPR(t) is the peak-to-average power ratio (PAPR) at time t. In addition, the alpha-numerals written in italic type in equations will be written in normal type in this specification for convenience. As is clear from Expression 1, the nonlinear phase of the light rotates in proportion to the PAPR.

In a communication system with the use of single wavelength light, the phase rotation of a signal occurs owing to the peak power of the signal itself (this phenomenon is called a self-phase modulation effect), which brings about a waveform distortion owing to a chromatic dispersion, and leads to the increase in the error rate of this communication system. In addition, in a wavelength multiplexing optical communication system, the phase rotation of a signal is induced by the peak powers of signals that have adjacent wavelengths (this phenomenon is called a cross-phase modulation effect), which also leads to the increase in the error rate of this communication system. These phase rotations induce phase rotations of subcarriers of an OFDM signal. To put it more precisely, a random phase rotation in accordance with the PAPR is induced around a constant phase rotation determined by the average power. When this random phase rotation exceeds a threshold for the symbol judgment, the symbol is judged to be an error. For example, in the case where a subcarrier is modulated by QPSK, if the phase rotation of the subcarrier outruns or underruns the ideal symbol point by $\pi/4$, the symbol is judged to be an error. Therefore, it is important to use a signal that has the smallest possible PAPR in optical transmission in view of the reduction of the error rate.

In wireless communication systems, many techniques for reducing a PAPR have been proposed. Main techniques are as follows:
(1) A technique in which, while a PAPR is being kept under a certain value using a hard limiter, interferences in the spectra of adjacent wireless channels are controlled using filters; (2) a technique in which, after data are mapped to subcarriers (in other words, after the subcarriers are modulated) plural times, a modulation that provides the smallest PAPR is selected; and (3) a technique in which, a signal is pre-coded, for example, by Trellis coding and given redundancy so that the signal has the small PAPR. Nonpatent literature 1 collectively describes the principles, advantages and drawbacks of these techniques. In addition, as described in nonpatent literature 2, a technique in which the envelope of a wireless signal is kept constant (that is, "PAPR=0 dB" is kept) with the use of phase modulation has been examined recently.

Studies in which the above PAPR reduction techniques are applied to optical OFDM communication systems have already been issued (Refer to nonpatent literatures 3 and 4). In addition, an optical OFDM communication system in which the envelope of a signal is kept constant with the use of the above described phase modulation has already devised according to Japanese Unexamined Patent Application Publication No. 2009-188510 (Patent Literature 1).

In addition, there are some literatures that disclose IQ modulation, direct detection, coherent detection, delay detection, and the like (for example, Patent Literatures (2 to 5).

CITATION LIST

Patent Literature

Patent Literature 1: Japanese Unexamined Patent Application Publication No. 2009-188510
Patent Literature 2: Japanese Unexamined Patent Application Publication No. 2008-211713
Patent Literature 3: Japanese Unexamined Patent Application Publication No. 2009-188509
Patent Literature 4: Japanese Unexamined Patent Application Publication No. 2008-135992

Patent Literature 5: Japanese Unexamined Patent Application Publication No. Hei11 (1999)-331089

Nonpatent Literature

Nonpatent Literature 1: S. H. Han, and J. H. Lee, "An Over view of Peak-to-Average Power Ratio Reduction Techniques for Multicarrier Transmission", IEEE Wireless Communications, April 2005, pp. 56-65.
Nonpatent Literature 2: S. C. Thompson, A. U. Ahmed, and J. G. Proakis, et al, "Constant Envelop OFDM", IEEE Transaction Communications, Vol. 56, No. 8, August 2008, pp. 130-1312.
Nonpatent Literature 3: B. Goebel, S. Hellerbrand, N. Haufe, et al, "PAPR Reduction Techniques for Coherent Optical OFDM Transmission", ICTON 2009, Mo. B2. 4, 2009.
Nonpatent Literature 4: B. Fred Buchali, et al, "Nonlinear Limits for High Bit-Rate OFDM Systems", IEEE Summer Topical Meeting 2009, MC4. 2, 2009.

SUMMARY OF INVENTION

Technical Problem

If the measures described in Nonpatent Literatures 3 and 4 are adopted, a PAPR is more than 6 dB, and this value of the PAPR is larger than that of an optical communication system with the use of OOK, hence only limited effects can be expected. In addition, the technique disclosed in Japanese Unexamined Patent Application Publication No. 2009-188510 can be applied only to a coherent receiving format. The configuration of the optical receiver of the coherent receiving format is four times as complex as that of the direct detection receiving format, and on top of that, the reception signal processing unit of the coherent receiving format becomes complex, hence a communication system that adopts the coherent receiving format becomes costlier than a communication system that adopts the direct detection format.

In an optical transmission in which the direct detection is performed, because current equal to the square of the absolute value of the electric field of light is brought out by a receiver, the phase information about the light is generally lost. Therefore, it is difficult to apply the PAPR reduction technique used in the wireless communication system without modification to the optical communication system.

The present invention was achieved with the above-mentioned problems in mind, and in an optical OFDM communication system, an object of the present invention is to provide an optical communication system in which a PAPR is smaller than that of an existing optical communication system at places where the optical power is large in an inner section of a transmission path, and to which a direct detection receiving format can be applied to; an optical receiver; an optical transponder; a wavelength multiplexing communication system; a wavelength multiplexing receiving device; and a wavelength multiplexing transponder. To put it concretely, the present invention intends to provide an communication system in which a PAPR of less than 3 dB can be achieved.

Solution to Problem

According to the present invention, the following processing is performed. The phase of light is modulated by a baseband OFDM signal. The phase-modulated light is transmitted via an optical fiber, and are converted to two intensity-modulated lights by a delay interferometer. The two lights are respectively converted to electrical signals. The obtained two electrical signals are respectively A/D converted, and brought back to the corresponding subcarriers by FFT. The differences between subcarriers having the same frequencies are calculated by subtraction about all the subcarriers, and the obtained subcarriers are decoded to regenerate data.

According to the first solution of the present invention to the above-mentioned problems, an optical communication system configured as follows is provided.

The optical communication system is equipped with:

an optical transmitter that modulates a plurality of subcarriers orthogonal to each other by mapping digital data to the plurality of subcarriers over a symbol time, and transmits the modulated subcarriers via an optical fiber as optical signals; and an optical receiver that photoelectrically converts the optical signals that are propagated along the optical fiber, decodes the subcarrier signals, and regenerates the original digital signals.

The optical transmitter includes:

a transmission signal processing unit that modulates a plurality of subcarriers orthogonal to each other by mapping digital data to the plurality of subcarriers over a symbol time, and performs inverse fast Fourier transform on the modulated subcarrier signals to generate a real base-band OFDM signal; and a phase modulator that phase-modulates light from a light source with the real base-band OFDM signal and sends out the phase-modulated light.

The optical receiver includes:

a delay interferometer that converts the phase-modulated optical signal that is sent from the optical transmitter via the optical fiber to two intensity-modulated optical signals;

two photoelectric converters that convert the two intensity-modulated optical signals to electrical signals;

two AD converters that respectively A/D convert the outputs sent from the two photoelectric converters;

two phase extraction units that respectively extract phases from the outputs of the two AD converters;

two reception signal pre-processing units that respectively perform FFT transform on the outputs of the two phase extraction units, and respectively obtain subcarrier signals;

a subtraction unit that calculates the differences between subcarrier signals having the same frequencies about all the subcarrier signals output from the two reception signal pre-processing units; and a reception signal post-processing unit that demodulates the outputs of the subtraction unit in units of respective subcarriers to obtain data, and regenerates the original digital data from the obtained data.

According to the second solution of the present invention to the above-mentioned problems, an optical receiver used in an optical communication system configured as follows is provided.

The optical communication system is quipped with:

an optical transmitter that modulates a plurality of subcarriers orthogonal to each other by mapping digital data to the plurality of subcarriers over a symbol time, performs inverse fast Fourier transform on the modulated subcarrier signals to generate a real base-band OFDM signal, and phase-modulates light from a light source with the real base-band OFDM signal and sends out the phase-modulated light; and an optical receiver that photoelectrically converts the optical signals that are propagated along the optical fiber, decodes the subcarrier signals, and regenerates the original digital signals.

The optical receiver includes a delay interferometer that converts the phase-modulated optical signal that is sent from the optical transmitter via the optical fiber to two intensity-modulated optical signals;

two photoelectric converters that convert the two intensity-modulated optical signals to electrical signals;

two AD converters that respectively A/D convert the outputs sent from the two photoelectric converters;

two phase extraction units that respectively extract phases from the outputs of the two AD converters;

two reception signal pre-processing units that respectively perform FFT transform on the outputs of the two phase extraction units, and respectively obtain subcarrier signals;

a subtraction unit that calculates the differences between subcarrier signals having the same frequencies about all the subcarrier signals output from the two reception signal pre-processing units; and a reception signal post-processing unit that demodulates the outputs of the subtraction unit in units of respective subcarriers to obtain data, and regenerates the original digital data from the obtained data.

According to the third solution of the present invention to the above-mentioned problems, an optical transponder configured as follows is provided.

The optical transponder is equipped with:

a transmitting unit including a transmission signal processing unit that modulates a plurality of subcarriers orthogonal to each other by mapping digital data to the plurality of subcarriers over a symbol time, and performs inverse fast Fourier transform on the modulated subcarrier signals to generate a real base-band OFDM signal, and a phase modulator that phase-modulates light from a light source with the real base-band OFDM signal and sends out the phase-modulated light; and a receiving unit including a delay interferometer that converts the phase-modulated optical signal that is sent from the optical transmitter via an optical fiber to two intensity-modulated optical signals, two photoelectric converters that convert the two intensity-modulated optical signals to electrical signals, two AD converters that respectively A/D convert the outputs sent from the two photoelectric converters, two phase extraction units that respectively extract phases from the outputs of the two AD converters, two reception signal pre-processing units that respectively perform FFT transform on the outputs of the two phase extraction units, and respectively obtain subcarrier signals, a subtraction unit that calculates the differences between subcarrier signals having the same frequencies about all the subcarrier signals output from the two reception signal pre-processing units, and a reception signal post-processing unit that demodulates the outputs of the subtraction unit in units of respective subcarriers to obtain data, and regenerates the original digital data from the obtained data.

According to the fourth solution of the present invention to the above-mentioned problems, a wavelength multiplexing optical communication system configured as follows is provided.

The wavelength multiplexing optical communication system is equipped with:

a wavelength multiplexing transmitting device that transmits a wavelength multiplexing optical signal that is obtained by multiplexing a plurality of optical signals with different wavelengths; and a wavelength multiplexing receiving device that demultiplexes the wavelength multiplexing optical signal sent via an optical fiber into optical signals in units of respective wavelengths, and receives the demultiplexed optical signals.

The wavelength multiplexing transmitting device include:

a plurality of optical transmitters; and an optical multiplexer that multiplexes the output lights of the plurality of optical transmitters, and outputs the wavelength multiplexing optical signal.

Each of the plurality of optical transmitters includes a light source with a wavelength different from others' wavelengths, a transmission signal processing unit that modulates a plurality of subcarriers orthogonal to each other by mapping digital data to the plurality of subcarriers over a symbol time, and performs inverse fast Fourier transform on the modulated subcarrier signals to generate a real base-band OFDM signal, and a phase modulator that phase-modulates light from the light source with the real base-band OFDM signal and outputs the phase-modulated light.

The wavelength multiplexing receiving device includes:

a delay interferometer that converts the wavelength multiplexing optical signal that is sent from the wavelength multiplexing transmitting device via the optical fiber to two intensity-modulated wavelength multiplexing optical signals;

two optical demultiplexers that demultiplexes the two intensity-modulated wavelength multiplexing optical signals into optical signals in units of respective wavelengths; and a plurality of optical receivers each of which receives two demultiplexed optical signals having the same wavelength among the demultiplexed optical signals.

Each of the plurality of optical receivers respectively includes two photoelectric converters that convert the two intensity-modulated optical signals with corresponding wavelength to electrical signals, two AD converters that respectively A/D convert the outputs sent from the two photoelectric converters, two phase extraction units that respectively extract phases from the outputs of the two AD converters, two reception signal pre-processing units that respectively perform FFT transform on the outputs of the two phase extraction units, and respectively obtain subcarrier signals, a subtraction unit that calculates the differences between subcarrier signals having the same frequencies about all the subcarrier signals output from the two reception signal pre-processing units, and a reception signal post-processing unit that demodulates the outputs of the subtraction unit in units of respective subcarriers to obtain data, and regenerates the original digital data from the obtained data.

According to the fifth solution of the present invention to the above-mentioned problems, a wavelength multiplexing receiving device used in a wavelength multiplexing optical communication system configured as follows is provided.

The wavelength multiplexing optical communication system is equipped with:

a wavelength multiplexing transmitting device that modulates a plurality of subcarriers orthogonal to each other by mapping digital data to the plurality of subcarriers over a symbol time, performs inverse fast Fourier transform on the modulated subcarrier signals to generate a real base-band OFDM signal, multiplexes output lights sent from a plurality of optical transmitters that phase-modulate lights from light sources with the real base-band OFDM signal, and transmits the wavelength multiplexed optical signal; and a wavelength multiplexing receiving device that demultiplexes the wavelength multiplexing optical signal sent via an optical fiber into optical signals in units of respective wavelengths, and receives the demultiplexed optical signals.

The wavelength multiplexing receiving device includes:

a delay interferometer that converts the wavelength multiplexing optical signal that is sent from the wavelength multiplexing transmitting device via the optical fiber to two intensity-modulated wavelength multiplexing optical signals;

two optical demultiplexers that demultiplexes the two intensity-modulated wavelength multiplexing optical signals into optical signals in units of respective wavelengths; and a plurality of optical receivers each of which receives two demultiplexed optical signals having the same wavelength among the demultiplexed optical signals.

Each of the plurality of optical receivers respectively includes:

two photoelectric converters that convert the two intensity-modulated optical signals with corresponding wavelength to electrical signals;

two AD converters that respectively A/D convert the outputs sent from the two photoelectric converters;

two phase extraction units that respectively extract phases from the outputs of the two AD converters;

two reception signal pre-processing units that respectively perform FFT transform on the outputs of the two phase extraction units, and respectively obtain subcarrier signals;

a subtraction unit that calculates the differences between subcarrier signals having the same frequencies about all the subcarrier signals output from the two reception signal pre-processing units; and a reception signal post-processing unit that demodulates the outputs of the subtraction unit in units of respective subcarriers to obtain data, and regenerates the original digital data from the obtained data.

According to the sixth solution of the present invention to the above-mentioned problems, a wavelength multiplexing optical transponder configured as follows is provided.

The wavelength multiplexing optical transponder is equipped with a wavelength multiplexing transmitting unit and a wavelength multiplexing receiving unit.

The wavelength multiplexing transmitting unit includes:

a plurality of optical transmitters; and an optical multiplexer that multiplexes the output lights of the plurality of optical transmitters, and outputs the wavelength multiplexing optical signal to an optical fiber.

Each of the plurality of optical transmitters includes:

a light source with a wavelength different from others' wavelengths;

a transmission signal processing unit that modulates a plurality of subcarriers orthogonal to each other by mapping digital data to the plurality of subcarriers over a symbol time, and performs inverse fast Fourier transform on the modulated subcarrier signals to generate a real base-band OFDM signal; and a phase modulator that phase-modulates light from a light source with the real base-band OFDM signal and outputs the phase-modulated light.

The wavelength multiplexing receiving unit includes:

a delay interferometer that converts the wavelength multiplexing optical signal that is sent via an optical fiber to two intensity-modulated wavelength multiplexing optical signals;

two optical demultiplexers that demultiplexes the two intensity-modulated wavelength multiplexing optical signals into optical signals in units of respective wavelengths; and a plurality of optical receivers each of which receives two demultiplexed optical signals having the same wavelength among the demultiplexed optical signals.

Each of the plurality of optical receivers respectively includes:

two photoelectric converters that respectively convert the two intensity-modulated optical signals with corresponding wavelength to electrical signals;

two AD converters that respectively A/D convert the outputs sent from the two photoelectric converters;

two phase extraction units that respectively extract phases from the outputs of the two AD converters;

two reception signal pre-processing units that respectively perform FFT transform on the outputs of the two phase extraction units, and respectively obtain subcarrier signals;

a subtraction unit that calculates the differences between subcarrier signals having the same frequencies about all the subcarrier signals output from the two reception signal pre-processing units; and a reception signal post-processing unit that demodulates the outputs of the subtraction unit in units of respective subcarriers to obtain data, and regenerates the original digital data from the obtained data.

According to the seventh solution of the present invention to the above-mentioned problems, an optical communication system configured as follows is provided.

The optical communication system is equipped with:

an optical transmitter that modulates a plurality of subcarriers orthogonal to each other by mapping digital data to the plurality of subcarriers over a symbol time, and transmits the modulated subcarriers via an optical fiber as optical signals; and an optical receiver that photoelectrically converts the optical signals that are propagated along the optical fiber, decodes the subcarrier signals, and regenerates the original digital signals.

The optical transmitter includes:

a transmission signal processing unit that modulates a plurality of subcarriers orthogonal to each other by mapping digital data to the plurality of subcarriers over a symbol time, and performs inverse fast Fourier transform on the modulated subcarrier signals to generate a real base-band OFDM signal; and a phase modulator that phase-modulates light from a light source with the real base-band OFDM signal and sends out the phase-modulated light.

The optical receiver includes:

a delay interferometer that converts the phase-modulated optical signal that is sent from the optical transmitter via the optical fiber to two intensity-modulated optical signals;

a photoelectric converter that converts the optical signals to electrical signals;

an AD converter that A/D converts the converted electrical signals;

a phase extraction unit that extracts phase components from the signals converted by the AD converter;

a reception signal pre-processing unit that performs FFT transform on the extracted phase components, and obtains subcarrier signals;

a reception signal post-processing unit that demodulates data got together by respective subcarriers, and regenerates the original digital data from the demodulated data; and a subtraction unit that calculates the difference between two signals corresponding to the two optical signals sent from the delay interferometer before the processing performed by the reception signal post-processing unit.

Advantageous Effects of Invention

According to the present invention, an optical OFDM communication system, in which a PAPR of almost 0 dB can be achieved at places where the optical power is large in the optical fiber transmission path, such as at a place just after an optical transmitter or an optical fiber amplifier, and receiver sensitivity degradation owing to the nonlinearity of the optical fiber can be reduced, and an optical transceiver used in this optical OFDM communication system can be provided. In addition, an optical OFDM communication system and an optical transceiver that can be used for long-distance transmission can be provided because the PAPR of the optical OFDM communication system can be reduced. In addition, because a direct detection receiving format is used in the present invention, the configuration of the communication system according to the present invention becomes simple compared with that of a communication system in which a coherent receiving format is used, hence a low-cost communication system and a low-cost optical transceiver can be provided.

BRIEF DESCRIPTION OF DRAWINGS

FIG. 8 is a functional block diagram of an optical communication system according to a fourth embodiment.

DESCRIPTION OF EMBODIMENTS

1. Principle and Outline

The principle of this embodiment will be described with reference to FIG. 1.

Figure 2:
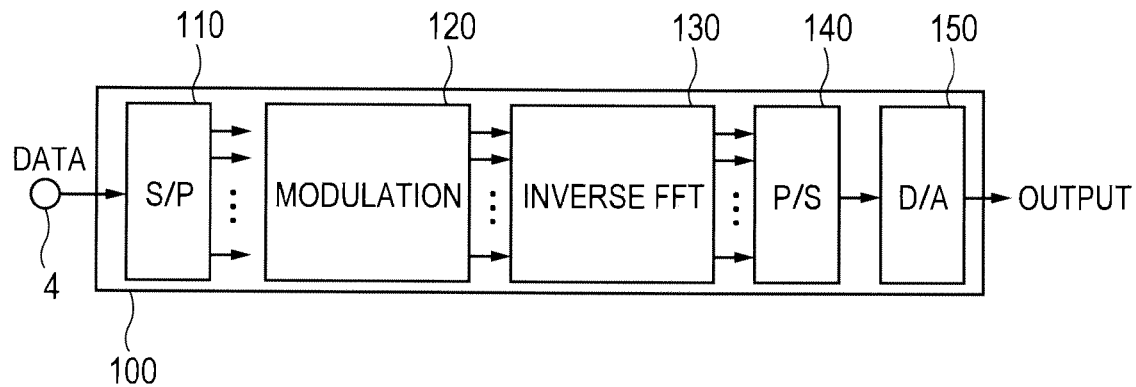
FIG. 2 is a functional block diagram of a transmission signal processing unit according to the present invention.

An optical communication system according to the present invention include an optical transmitter 1 and an optical receiver 2 which are connected to each other by an optical fiber 3. A transmission signal processing unit 100 in the optical transmitter 1 converts data, which is input from an input terminal 4 and to be transmitted, to a real base-band OFDM signal. The transmission signal processing unit 100 can be configured as shown in FIG. 2.

In order to generate a real base-band OFDM signal, it is necessary to use the real part or imaginary part of a complex OFDM signal, or it is necessary to make minus frequency components equal to the complex conjugates of corresponding plus frequency components respectively by devising the way to map data to subcarriers. For example, in the case where the real part of a complex OFDM signal is used as a real base-band OFDM signal, the base-band OFDM signal is given by the next equation.

[Expression 2]

$$\phi(t) = \mathrm{Re}\left\{\sum_{k=0}^{N-1} C_k \cdot \exp(j2\pi \cdot \Delta f \cdot k \cdot t)\right\} = \sum_{k=0}^{N-1} |C_k| \cdot \cos(2\pi \cdot \Delta f \cdot k \cdot t + \phi_k), \text{ for } 0 \leq t \leq T_s \quad (1)$$

where $C_k$ is a datum (a signal space coordinate. For example, if subcarrier modulation is performed by 4-QPSK, $C_k$ is $\pm 1 \pm i$). In addition, N is the number of subcarriers, $\Delta f$ is a subcarrier frequency interval, t is time, and $\phi k$ is the phase of a signal point, and it is given by Expression 3. Ts is one symbol time.

$$\phi_k = \tan^{-1}\{Im(C_k)/Re(C_k)\} \quad \text{[Expression 3]}$$

This real OFDM signal is amplified by a driver amplifier 10 in the optical transmitter, and drives an optical phase modulator 11. As a result, light with its frequency $f_c$ sent from a laser (light source) 12 is phase-modulated by the optical phase modulator 11 with the above OFDM signal, and the phase-modulated light is sent from the optical transmitter 1 to an optical fiber 3. The electric field of this transmission signal light is given by the next equation.

[Expression 4]

$$E(t)\sqrt{2 \cdot P_0} \cdot \cos(2\pi \cdot f_c \cdot t + h \cdot \phi(t)) \quad (2)$$

where h is the modulation index of the phase modulation, and Po is the average power of the light.

The power of this light P(t) is given by calculating the root-mean-square of Equation (2) per carrier period.

[Expression 5]

$$P(t) = P_0 \quad (3)$$

In other words, the PAPR of this light is 0 dB.

This optical signal is propagated along the optical fiber 3 which is a transmission path, and enters the optical receiver 2. The optical receiver 2 includes a delay interferometer 20 and a balanced optical receiving unit 200. In the optical receiver 2, after passing through the interferometer 20, the phase-modulated light is converted to two intensity-modulated lights. These intensity-modulated lights are converted to two electrical signals by two photodiodes 201 and 203 respectively. These two electrical signals are given by the following equations.

[Expression 6]

$$I_1(t) \propto \frac{P_0}{2}[1 - \cos\{2\pi \cdot f_c \cdot \tau + h \cdot \phi(t) - h \cdot \phi(t - \tau)\}] \quad (4)$$

[Expression 7]

$$I_2(t) \propto \frac{P_0}{2}[1 + \cos\{2\pi \cdot f_c \cdot \tau + h \cdot \phi(t) - h \cdot \phi(t - \tau)\}] \quad (5)$$

where $\tau$ is a delay time given by the delay interferometer 20. The delay time and the carrier frequency of the light are set so that the relationship between the delay time and the carrier frequency of the light is expressed by Equation (6).

[Expression 8]

$$2\pi \cdot f_c \cdot \tau = m \cdot \pi + \pi/2 \text{ (}m\text{ is a positive integer.)} \quad (6)$$

Figure 13:
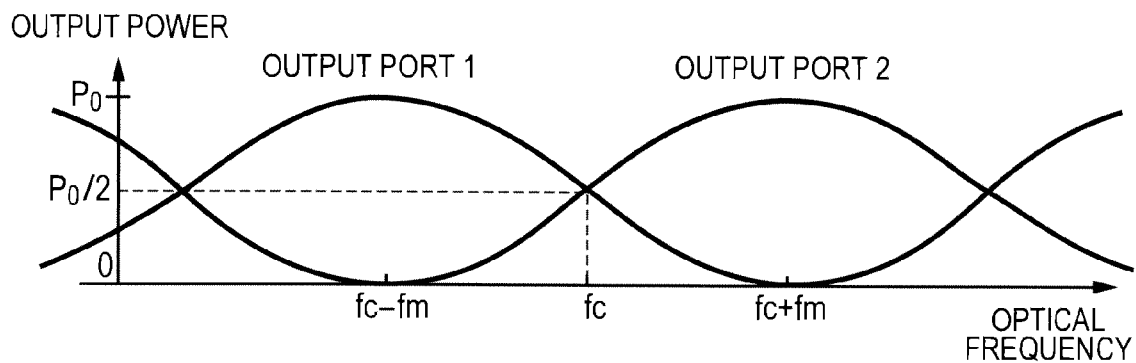
FIG. 13 is a schematic diagram showing the relationship between powers of two output ports of the delay interferometer and optical frequencies.

FIG. 13 shows the relationship between the transmittance of the delay interferometer 20 and the frequency of the light under the condition that Equation (6) is satisfied.

The above two electrical signals are given by the following Equations (7) and (8) respectively.

[Expression 9]

$$I_1(t) \propto \frac{P_0}{2}[1 \mp \sin\{h \cdot \phi(t) - h \cdot \phi(t - \tau)\}] \quad (7)$$

[Expression 10]

$$I_2(t) \propto \frac{P_0}{2}[1 \pm \sin\{h \cdot \phi(t) - h \cdot \phi(t - \tau)\}] \quad (8)$$

where the upper sign in the "±" is used in Equations (7) and (8) when m is an even number, and the lower sign in the "±" is used in Equations (7) and (8) when m is an odd number.

Next, it will be assumed that the relationship between the subcarrier frequency and the delay time $\tau$ of the delay interferometer 20 is given by the next equation.

[Expression 11]

$$2\pi \cdot \Delta f \cdot k \cdot \tau \approx \pi/2$$

$$(k = 0, 1, 2, \ldots, N-1) \quad (9)$$

In this case, the following approximation can be obtained.

[Expression 12]

$$\phi(t) - \phi(t - \tau) \cong \sqrt{2} \cdot \sum_{k=0}^{N-1} |C_k| \cdot \cos(2\pi \cdot \Delta f \cdot k \cdot t + \phi_k + \pi/4) \quad (10)$$

In other words, it turns out clear that the phases of the electrical signals (7) and (8) are equal to the phases of the subcarrier components of the base-band OFDM signal (1) shifted by a phase $\pi/4$.

Subsequently, the AC components of both electrical signals are A/D converted by the AD converters 205 and 206 respectively, and the phases of sin functions of the A/D converted AC components are detected by phase extraction units 207 and 208. As a result, signals that are equal to the real base-band OFDM signal (to be precise, the phases of the signals are shifted from the phase of the real base-band OFDM signal by $\pi/4$) are obtained. Subsequently, the real OFDM signal is respectively divided into corresponding subcarrier components by reception signal pre-processing units 210 and 220, and a subtraction unit 230 calculates the differences between subcarrier signals having the same frequencies about all the subcarrier signals. As is clear from Equations (7) and (8), the signs of the subcarriers shown by Equation (7) and those of the subcarriers shown by Equation (8) are opposite to each other; hence the amplitudes of the subcarriers obtained by this subtraction respectively become twice as large as those of corresponding subcarriers shown by Equation (7) or Equation (8). Afterward, the subcarriers obtained by the above subtraction are passed through a reception signal post-processing unit 240 for an ordinal OFDM signal so as to be decoded, and the decoded data are sent out from a terminal 5 as serial data.

The above is the description about the fundamental operation principle of the present invention. According to the present invention, an optical fiber communication with the use of an OFDM signal whose PAPR is 0 dB can be realized.

In addition, as is clear from Equations (7) and (8), an OFDM signal can be extracted from one of the two electrical signals. However, in this case, the other of the two electrical signals is actually discarded, which does not brings about such an advantage as the above subtraction circuit brings about, that is, an advantage that the amplitudes of the subcarriers respectively become twice as large as those of corresponding subcarriers shown by Equation (7) or Equation (8).

Figure 12:
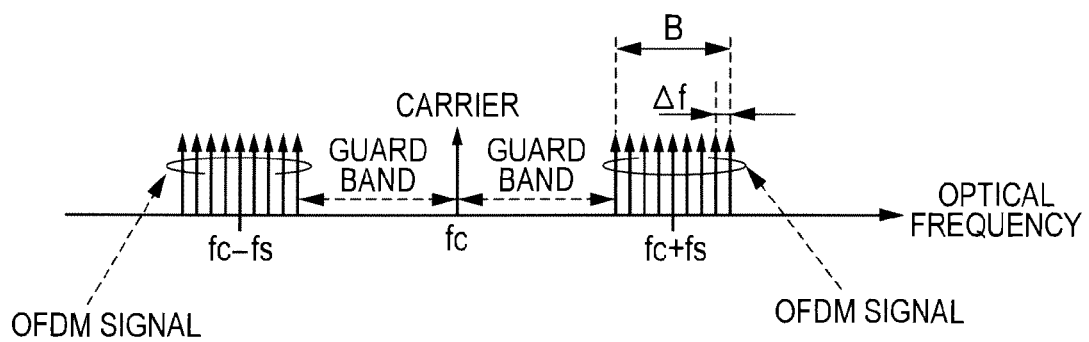
FIG. 12 is a schematic diagram of spectra of an optical phase-modulated OFDM signal according to the present invention.

In addition, although there is no case where Equation (9) is exactly satisfied for all the subcarriers, if a spectral arrangement as shown in FIG. 12 can be realized, Equation (9) can be approximately satisfied for all the subcarriers. In other words, when the bandwidth of the OFDM signal is expressed by B, and the center frequency of the optical OFDM signal is expressed by $f_c + f_s$, if Equations (11) and (12) are satisfied, Equation (9) is satisfied for almost all the subcarriers.

[Expression 13]

$$2\pi \cdot f_s \cdot \tau = n \cdot \pi/2 \text{ (}n\text{ is a positive odd number.)} \quad (11)$$

[Expression 14]

$$f_s \geq 1.5 \cdot B \quad (12)$$

For example, because the carrier frequency of the light $f_c$ is prescribed by some standard or others, the value of the delay time $\tau$ can be determined from Equation (6) with the use of the prescribed carrier frequency $f_c$, and the determined value of the delay time $\tau$ can be set in advance in the delay interferometer 20. In addition, with the use of the determined value of the delay time $\tau$, the center frequency $f_s$ and the bandwidth B of the OFDM signal can be obtained from Equations (11) and (12).

In the case where the spectral arrangement shown in FIG. 12 is realized, that is, Equations (11) and (12) are satisfied, it becomes possible to prevent beat signals among the subcarriers and beat signals between the carrier and the subcarriers (signals to be fundamentally needed) generated by the photoelectric conversion from interfering in each other, hence a high-sensitive receiving can be realized.

1. First Embodiment

A first embodiment will be described with reference to FIG. 1 and the like. Although it will be assumed that a modulation format for subcarriers is 4-QAM for convenience of explanation hereinafter, a modulation format that can be used in the present invention is not limited to 4-QAM, and any subcarrier modulation format can be used. In addition the number of subcarriers is assumed to be N (N is 1 or a larger integer).

Figure 1:
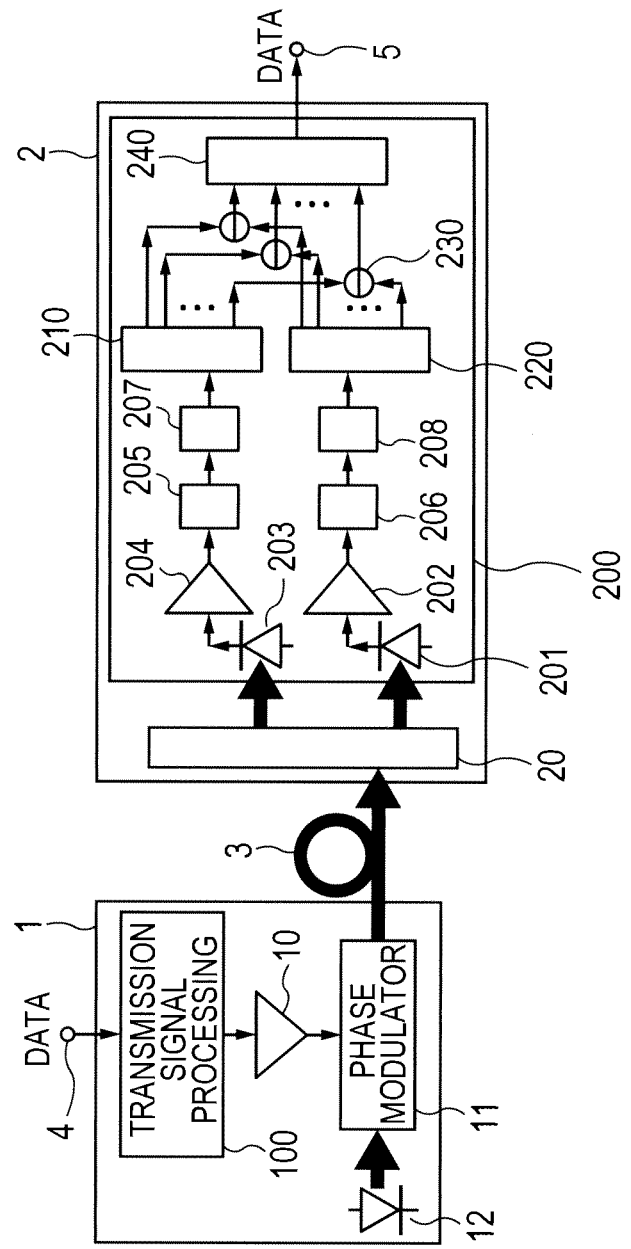
FIG. 1 is a functional block diagram of an optical communication system according to the present invention.

FIG. 1 shows a block diagram of an optical OFDM communication system.

The optical OFDM communication system includes, for example, an optical transmitter 1, an optical fiber 3, and an optical receiver 2. The optical transmitter 1 includes, for example, a transmission signal processing unit 100, a drive amplifier 10, an optical phase modulator 11, and a laser source 12. The optical transmitter 1 can includes an input terminal 4. The optical receiver 2 includes a delay interferometer 20, a balanced optical receiving unit 200. The optical receiver 2 can includes an output terminal 5. The optical transmitter 1 and the optical receiver 2 is connected via the optical fiber 3.

FIG. 2 is a block diagram showing a transmission signal processing unit 100 according to a first embodiment.

The transmission signal processing unit 100 includes, for example, a serial-parallel (S/P) converter 110, a subcarrier modulation unit 120, an inverse FFT (inverse fast Fourier transform) unit 130, a parallel-serial (P/S) converter 140, and a digital-analog (D/A) converter 150. In addition, it goes without saying that a cyclic prefix insertion (CPI) unit can be installed between the P/S converter 140 and the DA converter 150.

Data to be fundamentally transmitted is converted to 2N parallel data (wherein 2N is the number of data) in the s/P converter 110. The subcarrier modulation unit 120 modulates N subcarriers (wherein N is the number of subcarriers) with these parallel data. These modulated subcarriers (Ck, k=0, 1, . . . , N−1) are input to the inverse FFT unit 130. The input signals are converted to data along a time axis in the inverse FFT unit 130, and converted to serial data in the P/S converter 140. This serial data is sent out as analog data after passing through the DA converter 150. This analog data is referred to as a base-band ODFM signal.

It is necessary that this base-band OFDM signal is composed of real numbers in this embodiment in order to phase-modulate light with the use of this base-band OFDM signal. In order to generate an OFDM signal composed of real numbers (called a real OFDM signal for short hereinafter), it is necessary to use the real part or imaginary part of a complex OFDM signal, or it is necessary to make minus frequency components equal to the complex conjugates of corresponding plus frequency components respectively by devising how to map data to subcarriers. Let's take up the case where the real part of a complex OFDM signal is used as an example. In this case, for example, processing to extract the real part from the complex OFDM signal is performed between the P/S converter 140 and the DA converter 150 shown in FIG. 2. The obtained real OFDM signal can be expressed by Equation (1).

The output light from the laser 12 is phase-modulated with the above real OFDM signal in the phase modulator 11, and the phase-modulated light is sent out to the optical fiber 3. As a phase modulator 11, a device that utilizes an electro-optical effect provided by an optical wave guide formed on an $LiNbO_3$ (lithium niobate) substrate is well known. In addition, a so-called MZ (Mach Zehnder) modulator or optical IQ modulator can be used as a phase modulator 11.

The output light of the optical transmitter, that is, the electric field of the transmission light can be expressed by Equation (2). As already shown by Equation (3), the PAPR of this transmission light is theoretically 0 dB.

Hereinafter, the small signal approximation will be used so that the following description can be made easier. In this case, the electric field of a transmission light shown by Equation (2) can be approximated by the next equation.

[Expression 15]

$$E(t) \cong \sqrt{2 \cdot P_0} \cdot \{\cos(2\pi \cdot f_c \cdot t) - h \cdot \phi(t) \cdot \sin(2\pi \cdot f_c \cdot t)\} = \sqrt{2 \cdot P_0} \cdot \quad (13)$$

$$\left[ \cos(2\pi \cdot f_c \cdot t) - \frac{h}{2} \cdot \sum_{k=0}^{N-1} |C_k| \cdot \{\sin(2\pi \cdot (f_c + \Delta f \cdot k) \cdot t + \phi_k) + \sin(2\pi \cdot (f_c - \Delta f \cdot k) \cdot t - \phi_k)\} \right]$$

Figure 11:
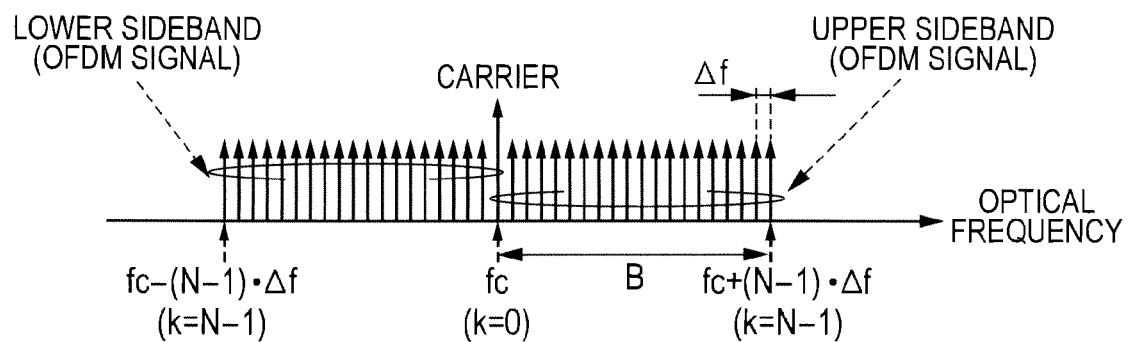
FIG. 11 is a schematic diagram of spectra of an optical phase-modulated OFDM signal.

It can be understood from Equation (13) that the transmission light is composed of a carrier light (the first term on the right-hand side) and an upper sideband (the second term on the right-hand side) and a lower sideband (the third term on the right-hand side) in which both sidebands are composed of subcarrier signals. The spectra of this transmission light is shown in FIG. 11. FIG. 11 is a figure that shows the relationship between the frequencies of the subcarriers and k in such a way that the relationship may be easily understood. It can be understood from FIG. 11 that the transmission light has spectra of the base-band OFDM signal that is frequency-converted to the optical carrier frequency $f_c$ under the small signal approximation. In addition, the frequency band width B that is occupied by the upper or lower sideband can be expressed by the next equation.

$$B \approx (N-1) \cdot \Delta f \quad \text{[Expression]}$$

This phase-modulated transmission light passes thorough the optical fiber 3 which is a transmission path, and enters the optical receiver 2. Although the optical transmission path is expressed by the optical fiber 3 in FIG. 1, it is necessary to install an optical fiber amplifier per a constant distance, for example, 60 km or 80 km in order to compensate for a loss brought about by an optical fiber in the case of a long-distance communication. Alternatively, in the case of a long distance communication, a chromatic dispersion compensation fiber is sometimes used as well as an optical fiber amplifier. The following description will be made about a short-distance communication system or a long-distance communication system in which compensation for chromatic dispersion is made, and the influence of chromatic dispersion brought about by an optical fiber will be explained later.

Figure 5:
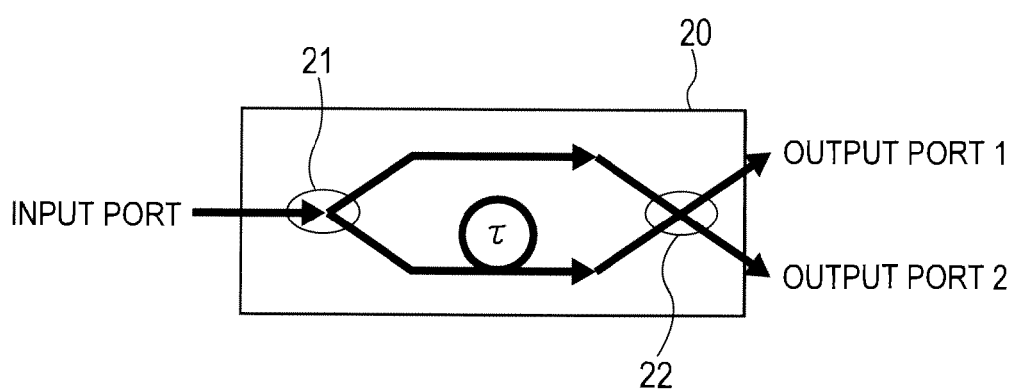
FIG. 5 is a block diagram of a delay interferometer.

The optical receiver 2 includes the delay interferometer 20 and the balanced optical receiving unit 200. FIG. 5 shows the fundamental configuration of the delay interferometer 20. The light that enters an input port is split in two by a photocoupler unit 21, and one optical signal is delayed by a predetermined delay time τ in comparison with the other. Subsequently, the two optical signal are combined in an photocoupler unit 22, and output from an output port 1 and an output port 2. This delay interferometer 20 can be composed of optical fibers and two photocouplers. In addition, the delay interferometer 20 can be realized by a so-called PLC (planar lightwave circuit) device such as a glass wave guide or a semiconductor wave guide. Alternatively, the delay interferometer 20 can be realized as a device configured with spatial optical systems.

Two optical powers sent out from the two output ports of this delay interferometer 20 can be expressed in the form of two sine waves whose phases are opposite to each other as shown in FIG. 13. The frequency interval between two adjacent peaks of one of the output powers is a reciprocal of the delay time of the delay interferometer 20, that is, 1/τ. To be more precise, the optical powers from the two output ports have frequency dependences given by the next equation.

[Expression 17]

$$P(f) = \frac{P_0}{2} \cdot \{1 \pm \cos(2\pi \cdot f \cdot \tau)\}$$

Here, it is necessary to adjust the delay time of the delay interferometer 20 so that Equation (6) is satisfied between the center frequency of the transmission light, that is, the optical frequency $f_c$ of the carrier light and the delay time $\tau$. As a concrete means to adjust the delay time, a means in which an electric heater is installed in one of the light wave guides for the two lights generated by the photocoupler unit 21, and the interference phase is adjusted by changing the equivalent refractive index of the light wave guide with a current flowing through the electric heater or other means can be taken. FIG. 13 shows the relationship between the carrier frequency $f_c$ and the transmittance of the delay interferometer under the condition that the delay time has been adjusted. In other words, when Equation (6) is satisfied, the outputs of the carrier lights from the output ports 1 and 2 respectively become $P_0/2$.

If the center frequencies of the sidebands of the transmission light are expressed by $f_c \pm f_s$ (the upper "+" in the "±" sign is used for the upper sideband, and the lower "−" in the "±" sign is used for the lower sideband), and the bandwidth is expressed by B, Equations (11) and (12) are approximately satisfied. The spectra of the transmission light under this condition are shown in FIG. 12. In addition, the relationship between the transmittance of the delay interferometer 20 and the frequency $f_s$ is shown in FIG. 13. Here, $f_s$ in FIG. 12 is equal to $f_m$ in FIG. 13. When Equations (11) and (12) are approximately satisfied, the upper side band is almost entirely output from the output port 2, and the lower side band is almost entirely output from the output port 1. In other words, the lower sideband and a half of the carrier light with a half of the original power are output from the output port 1, and the upper sideband and a half of the carrier light with a half of the original power are output from the output port 2. Here, the above description is for the case where m is an even number in Equation (6), and if m is an odd number in Equation (6), the explanation about the output port 1 and the explanation about the output port 2 have to be exchanged.

As a method to realize the spectra shown in FIG. 12, there is the next means ¥ for example. As already shown by Equation (13) and FIG. 11, a phase-modulated transmission light is generally composed of a carrier light and sidebands of a frequency-converted OFDM signal. Here, the data mapping is performed on subcarriers in the transmission signal processing unit 100 of the optical transmitter 1 so that $c_k$=0 (k=0, 1, . . . , q−1). In other words, the 0th subcarrier to the (q−1)th subcarrier are not modulated and the qth subcarrier to the (N−1)th subcarrier are modulated, and all the subcarriers are transmitted, that is, a zero padding operation is performed. As a result, the spectra of the transmission light become those as shown in FIG. 12. In this case, the frequency range occupied by the 0th subcarrier to the (q−1) th subcarrier becomes a guard band. In addition, the center frequencies of the sidebands are given by Expression 18.

$$f_c \pm f_s = f_c \pm (N-q-1) \cdot \Delta f/2 \qquad \text{[Expression 18]}$$

In addition, the bandwidth of each sideband is given by Expression 19.

$$B \approx (N-q-1) \cdot \Delta f \qquad \text{[Expression 19]}$$

The relationship shown in FIG. 12 and the relationship shown in FIG. 13 are approximately satisfied, carrier lights and the upper sideband and lower sideband are respectively output from the two output ports of the delay interferometer 20. These lights are intensity-modulated lights. In other words, when Equations (11) and (12) are approximately satisfied, the transmission light expressed by Equation (13) passes through the delay interferometer 20, and is output from the output ports in the forms of lights expressed by the following equations.

[Expression 20]

$$E_1(t) \cong \frac{P_0}{2} \cdot \left[ \pm \sqrt{2} \cdot \cos\left(2\pi \cdot f_c \cdot t \pm \frac{\pi}{4}\right) - h \cdot \sum_{k=0}^{N-1} |C_k| \cdot \cos\{2\pi \cdot (f_c \mp \Delta f \cdot k) \cdot t \mp \phi_k\} \right] \qquad (14)$$

[Expression 21]

$$E_2(t) \cong \frac{P_0}{2} \cdot \left[ \mp \sqrt{2} \cdot \sin\left(2\pi \cdot f_c \cdot t \mp \frac{\pi}{4}\right) - h \cdot \sum_{k=0}^{N-1} |C_k| \cdot \sin\{2\pi \cdot (f_c \pm \Delta f \cdot k) \cdot t \pm \phi_k\} \right] \qquad (15)$$

where the upper sign in the "±" is used in Equations (14) and (15) when m is an even number, and the lower sign in the "±" is used in Equations (14) and (15) when m is an odd number.

These lights are respectively converted to photo currents by photodiodes 201 and 203. These photo currents can be expressed by the following equations.

[Expression 22]

$$I_1 \cong R \cdot \frac{P_0}{2} \cdot \left[ 1 \mp \sqrt{2} \cdot h \cdot \sum_{k=0}^{N-1} |C_k| \cdot \cos\left(2\pi \cdot \Delta f \cdot k \cdot t + \phi_k + \frac{\pi}{4}\right) + h^2 \cdot K_1 \right] \qquad (16)$$

[Expression 23]

$$I_2 \cong R \cdot \frac{P_0}{2} \cdot \left[ 1 \pm \sqrt{2} \cdot h \cdot \sum_{k=0}^{N-1} |C_k| \cdot \cos\left(2\pi \cdot \Delta f \cdot k \cdot t + \phi_k + \frac{\pi}{4}\right) + h^2 \cdot K_1 \right] \qquad (17)$$

where the upper sign in the "±" is used in Equations (16) and (17) when m is an even number, and the lower sign in the "±" is used in Equations (16) and (17) when m is an odd number. In addition, R is a photoelectric conversion efficiency, and $K_1$ is given by the next equation.

[Expression 24]

$$K_1 = \frac{1}{2} \cdot \sum_{k=0}^{N-1} \sum_{l=0}^{N-1} \cos\{2\pi \cdot \Delta f \cdot (k-1) \cdot t + (\phi_k - \phi_l)\} \qquad (18)$$

Figure 14:
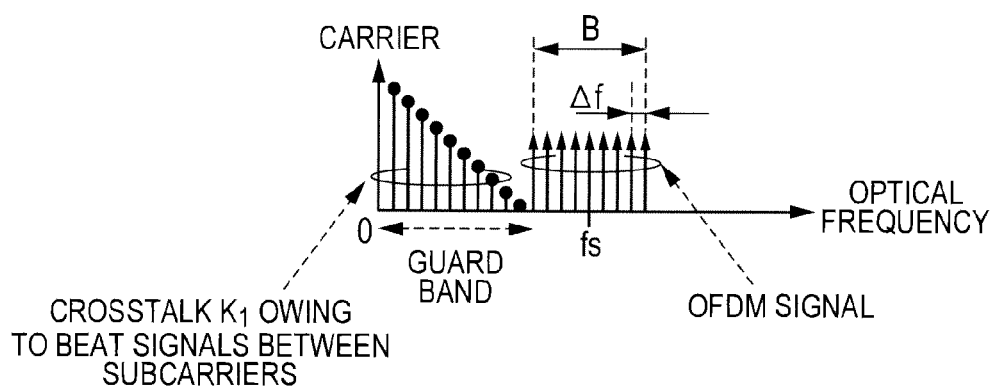
FIG. 14 is a schematic diagram showing spectra of optical currents according to the present invention.

$K_1$ is beat signals between subcarriers. When the condition (12) is satisfied, the frequency components of these carrier beat signals are concentrated in the neighborhood of DC. This phenomenon is shown in FIG. 14. FIG. 14 shows the spectra of the photo currents $I_1$ and $I_2$. As is clear from FIG. 14, if the condition (12) is not satisfied, the beat signals between the subcarriers overlaps and interferes with the OFDM signal, which leads to the degradation of the code error rate. If the condition (12) is satisfied, the beat signals $K_1$ between the subcarriers and the OFDM signal to be fundamentally received can be completely separated from each other. As a method for separating the beat signals $K_1$ and the OFDM signal, there is a method in which a high-pass filter for cutting off the beat signals between the subcarriers, or another method in which predetermined pieces of signal processing are performed on the light entering the photo receiver as it is, and after the subcarriers are obtained by FFT, the subsequent pieces of signal processing are not performed on subcarriers in a low frequency band that include the beat signals $K_1$ between subcarriers. The term concerning $K_1$ will be neglected in the following discussions because the term can be excluded using any one of the above methods. In this case, judging from Equations (16) and (17), it turns out clear that the light currents are electric signals that include the base-band OFDM signal (1).

Equations (16) and (17) show the photocurrents in the case of the small signal approximation. As described above, the photocurrents in the large signal model can be respectively expressed by the following equations.

[Expression 25]

$$I_1 \cong R \cdot \frac{P_0}{2} \cdot \left[ 1 \mp \sin\left\{ \sqrt{2} \cdot h \cdot \sum_{k=0}^{N-1} |C_k| \cdot \cos(2\pi \cdot \Delta f \cdot k \cdot t + \phi_k + \frac{\pi}{4}) \right\} \right] \quad (19)$$

[Expression 26]

$$I_2 \cong R \cdot \frac{P_0}{2} \cdot \left[ 1 \pm \sin\left\{ \sqrt{2} \cdot h \cdot \sum_{k=0}^{N-1} |C_k| \cdot \cos(2\pi \cdot \Delta f \cdot k \cdot t + \phi_k + \frac{\pi}{4}) \right\} \right] \quad (20)$$

As is clear from these equations, the base-band OFDM signal is included in the phases of sine functions of the photocurrents $I_1$ and $I_2$.

Figure 3:
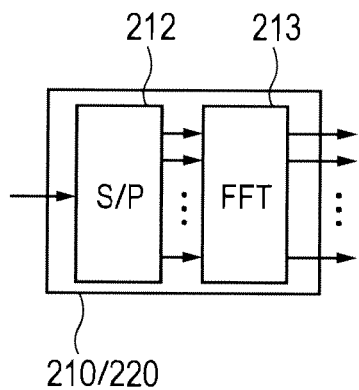
FIG. 3 is a functional block diagram of a reception signal pre-processing unit according to the present invention.

The AC components of these electrical signals are respectively amplified by preamplifiers 202 and 204, and are respectively converted to digital signals by AD converters 205 and 206. Subsequently, these digital signals are respectively sent to phase extraction units 207 and 208 that extracts a phase of a sine function. In the phase extraction units 207 and 208, as a means for implementing signal processing for extracting a phase of a sine function, a means for actually performing arcsine calculation or a means for utilizing a look-up table is conceivable. The outputs of the above processing are the phase parts of Equations (19) and (20), and each of them becomes the base-band OFDM signal (1) itself. These signals are respectively sent to reception signal pre-processing units 210 and 220 in the later stage. In the reception signal pre-processing units 210 and 220, S/P conversion and FFT processing are performed on both electrical signal respectively, and subcarrier signals are extracted. The reception signal pre-processing units 210 and 220 can be configured as shown in FIG. 3. In other words, a usual signal processing configuration for an OFDM signal can be used. It goes without saying that, if cyclic prefixes are used on the optical transmitter side, the cyclic prefixes have to be removed just before the process in an S/P converter 212.

Figure 4:
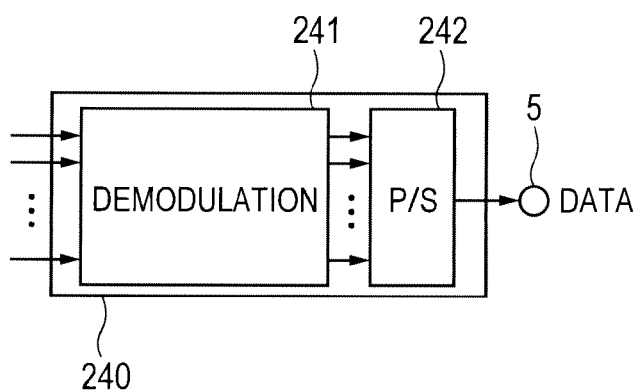
FIG. 4 is a functional block diagram of a reception signal post-processing unit according to the present invention.

The differences between subcarriers having the same frequencies are calculated in a subtraction unit 230 about all the subcarriers that are outputs from the reception signal pre-processing units 210 and 220. The upper sideband components and the lower sideband components of both lights are added by this subtraction, and both signal energies are effectively used, which can prevent sensitivity degradation from occurring. The above thing can be easily understood because the signs of the AC components of the optical currents $I_1$ and $I_2$ are opposite to each other in Equations (19) and (20). The outputs of this subtraction unit 230 is sent to a reception signal post-processing unit 240, and demodulated and output from the output terminal 5 as serial data. The reception signal post-processing units 240 can be configured as shown in FIG. 4, and a usual signal processing configuration for an OFDM signal can be used.

Here, the base-band OFDM signal used in this embodiment is a real OFDM signal as described above. In the signal processing performed on this real OFDM signal on the receiving side, it is well known that a recommendable sampling interval of sampling performed in the AD converter 205 and 206 is $T_s/(2 \cdot N)$, that is, a half of an ordinary sampling interval. In this case, obtained signals are oversampled signals, and the phases of signals that outrun $+\pi$ or underrun $-\pi$ can be rewinded.

The description about this embodiment has been made under the condition that the chromatic dispersion of an optical fiber is negligible. The above condition is satisfied in the case where a communication system has a short transmission distance, where a dispersion shift fiber is used as an optical fiber for a transmission path of a communication system, or where the chromatic dispersion of an optical fiber that is a transmission path in a communication system is almost canceled with the use of a dispersion compensation device.

(Modification)

In the case where the influence of this chromatic dispersion is negligible, the optical currents are given by Equations (19) and (20). It can be understood from these equations that there is another embodiment in which a subtraction is performed in order to calculate the difference between the two optical current components in an earlier stage before the signals are respectively divided into corresponding subcarriers, and the differences between subcarriers having the same frequencies are calculated by subtraction about all the subcarriers as described in the above embodiment.

Figure 6:
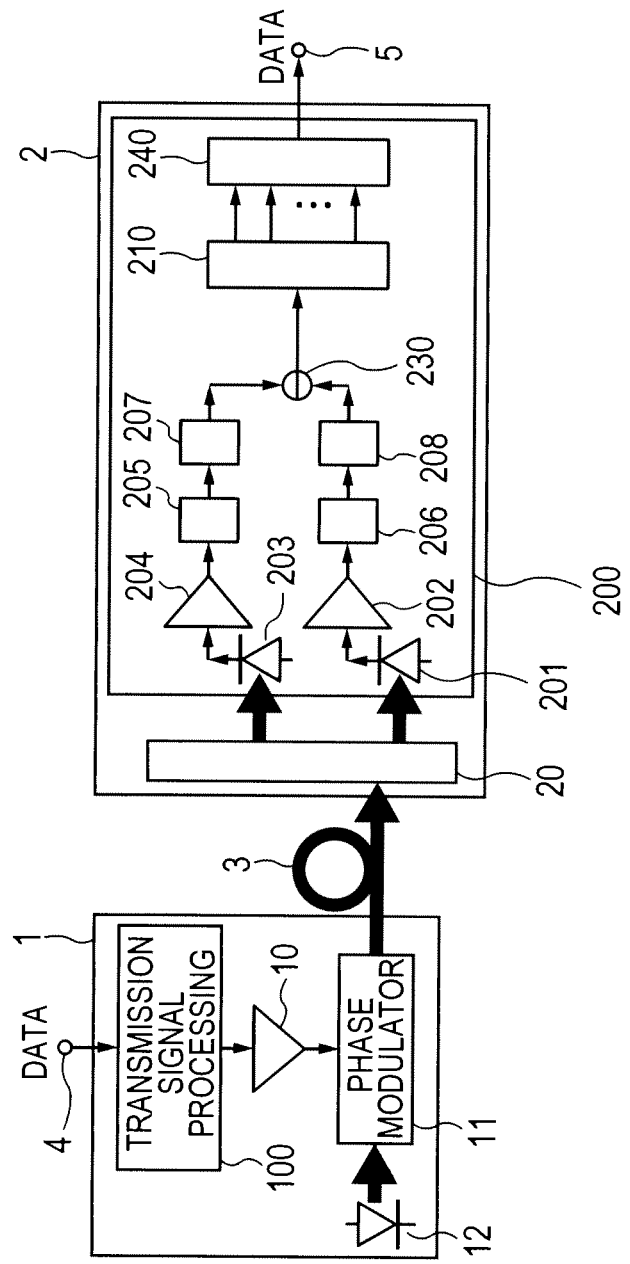
FIG. 6 is a functional block diagram of an optical communication system according to a second embodiment.
Figure 7:
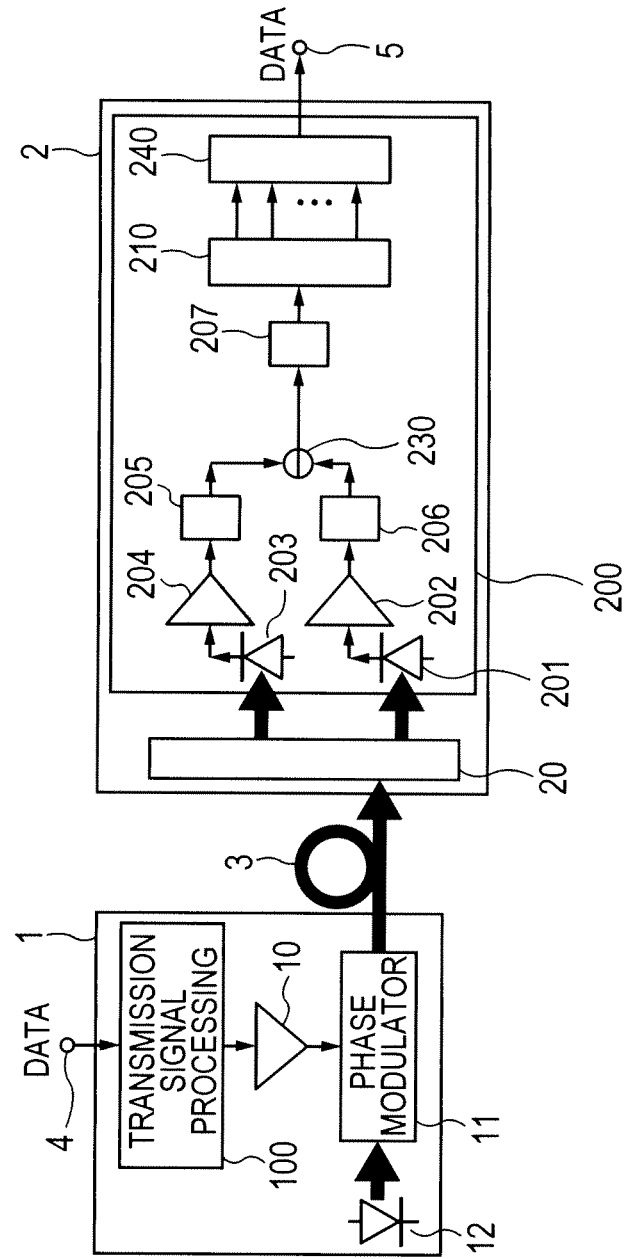
FIG. 7 is a functional block diagram of an optical communication system according to a third embodiment.
Figure 9A:
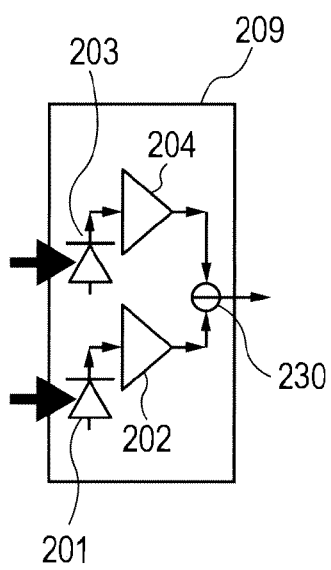
FIGS. 9A, 9B and 9C are functional block diagrams of an optical front-end unit.
Figure 9B:
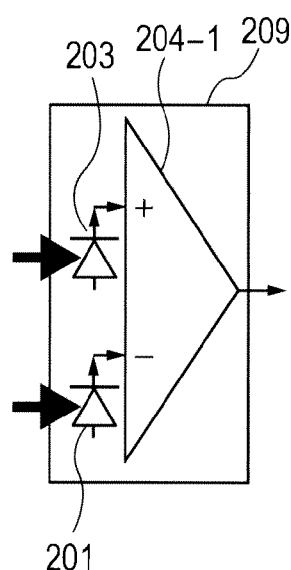
Figure 9C:
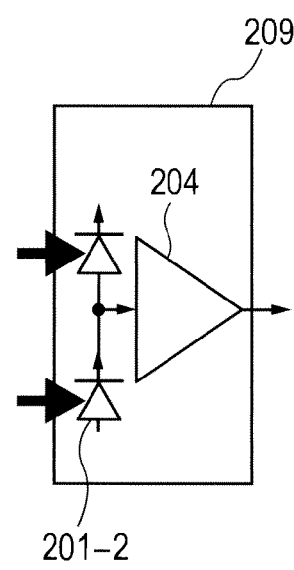

For example, FIG. 6 is a diagram showing an embodiment in which a subtraction is made with the use of the outputs of the phase extraction units 207 and 208 that extract the phase of a sine function. FIG. 7 is a diagram showing an embodiment in which a subtraction is made with the use of the outputs of the AD converters 205 and 206. In addition, FIG. 8 is a diagram showing an embodiment in which a subtraction is made inside an optical front-end unit 209. An example of the configuration of this optical front-end 209 is shown in FIG. 9 (a), FIG. 9 (b), or FIG. 9 (c). In FIG. 9 (a), the difference between the outputs of the preamplifiers 202 and 204 is calculated. In FIG. 9 (b), the difference between the optical currents is calculated using a differential preamplifier 204-1 as a preamplifier. In addition, in FIG. 9 (c), a subtraction is performed using a balanced photodiode 201-1.

Next, an optical communication system in which the chromatic dispersion of an optical fiber is not negligible will be briefly described hereinafter. Hereinafter, the small signal approximation will be used again so that the following description can be made easier. As is clear from Equation (13), the electric field of a transmission light is composed of a carrier light and an upper sideband and a lower sideband wherein both sidebands are composed of subcarriers of an OFDM signal. If the chromatic dispersion of the optical fiber is large, the phases of subcarriers are subject to phase rotations owing to the chromatic dispersion. This amount of a phase rotation is proportional to the square of the frequency difference $\pm\Delta f \cdot k$ between the carrier frequency $f_c$ of light and a subcarrier frequency $f_c \pm \Delta f \cdot k$. In other words, the amount of the phase rotation owing to the chromatic dispersion is given by next equation.

[Expression 27]

$$\theta_k = \frac{1}{2} \cdot \beta_2 \cdot L \cdot (2\pi \cdot \Delta f \cdot k)^2$$

$$(k=0,1,2 \ldots N-1) \quad (21)$$

where $\beta 2$, which is the second derivative of the propagation constant with respect to an angular frequency, expresses the chromatic dispersion of the optical fiber, and L is the length of the optical fiber. It will be noted that the amounts of the phase rotations vary depending on the subcarriers (that is, depending on k), and that two subcarriers corresponding to the same k in the upper sideband and lower sideband are subject to the same amount of the phase rotation.

If these phase rotations owing to the chromatic dispersion are taken into consideration, when the phase-modulated transmission light (13) reaches the optical receiver 2 after passing through the optical fiber 3, the electric field of the phase-modulated transmission light is given by the next equation.

[Expression 28]

$$E(t) \cong \sqrt{2 \cdot P_0} \cdot \left[ \cos(2\pi \cdot f_c \cdot t) - \frac{h}{2} \sum_{k=0}^{N-1} |C_k| \cdot \{\sin(2\pi \cdot (f_c + \Delta f \cdot k) \cdot t + \phi_k + \phi_k) + \sin(2\pi \cdot (f_c - \Delta f \cdot k) \cdot t - \phi_k + \phi_k)\} \right] \quad (22)$$

When this light enters the delay interferometer 20, the optical lights $I_1$ and $I_2$ sent out respectively from the output port 1 and the output port 2 can be expressed by the following equations under the condition that Equations (11) and (12) are almost satisfied.

[Expression 29]

$$I_1 \cong R \cdot \frac{P_0}{2} \cdot \left[ 1 \mp \sqrt{2} \cdot h \cdot \sum_{k=0}^{N-1} |C_k| \cdot \cos\left(2\pi \cdot \Delta f \cdot k \cdot t + \phi_k + \frac{\pi}{4} \mp \theta_k\right) \right] \quad (23)$$

[Expression 30]

$$I_2 \cong R \cdot \frac{P_0}{2} \cdot \left[ 1 \pm \sqrt{2} \cdot h \cdot \sum_{k=0}^{N-1} |C_k| \cdot \cos\left(2\pi \cdot \Delta f \cdot k \cdot t + \phi_k + \frac{\pi}{4} \pm \theta_k\right) \right] \quad (24)$$

where the upper sign in the "$\pm$" is used in Equations (23) and (24) when m is an even number, and the lower sign in the "$\pm$" is used in Equations (23) and (24) when m is an odd number. In addition, the terms proportional to $h^2$ are omitted.

Although the above discussion has been made under the small signal approximation, the optical currents $I_1$ and $I_2$ in the large signal model are approximately expressed as follows.

[Expression 31]

$$I_1 \cong \quad (25)$$
$$R \cdot \frac{P_0}{2} \cdot \left[ 1 \mp \sin\left\{ \sqrt{2} \cdot h \cdot \sum_{k=0}^{N-1} |C_k| \cdot \cos\left(2\pi \cdot \Delta f \cdot k \cdot t + \phi_k + \frac{\pi}{4} \mp \theta_k\right) \right\} \right]$$

[Expression 32]

$$I_2 \cong \quad (26)$$
$$R \cdot \frac{P_0}{2} \cdot \left[ 1 \pm \sin\left\{ \sqrt{2} \cdot h \cdot \sum_{k=0}^{N-1} |C_k| \cdot \cos\left(2\pi \cdot \Delta f \cdot k \cdot t + \phi_k + \frac{\pi}{4} \pm \theta_k\right) \right\} \right]$$

Figure 10:
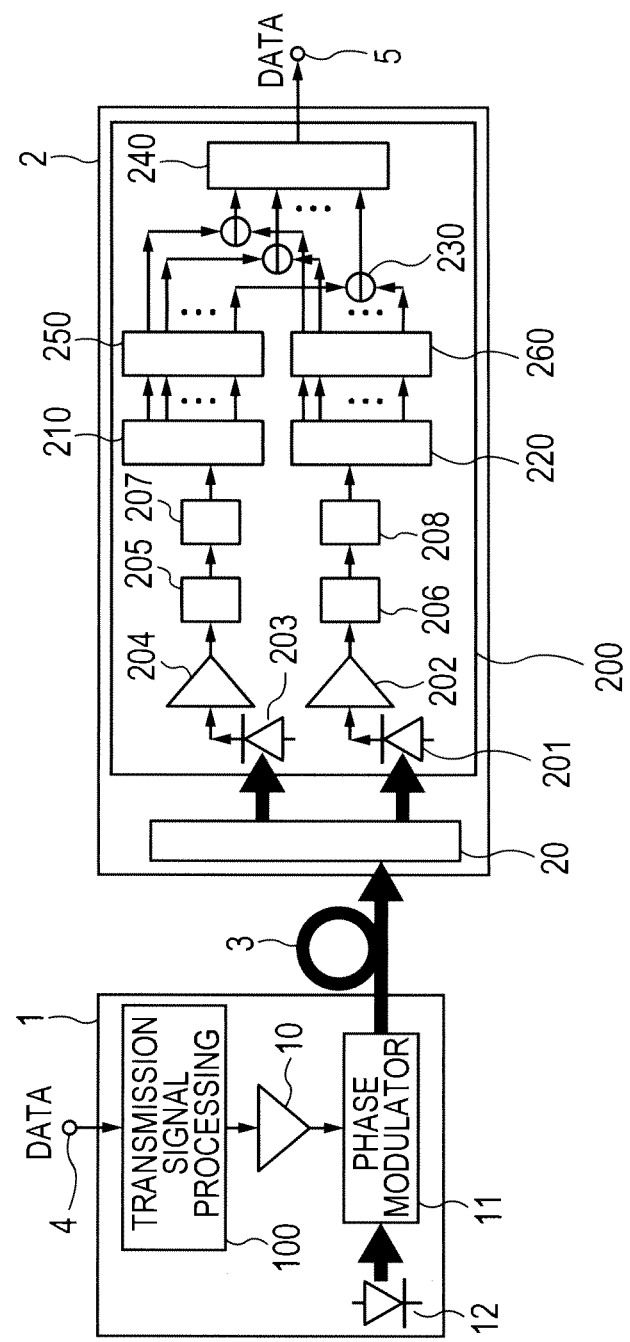
FIG. 10 is a functional block diagram of an optical communication system according to a fifth embodiment.

If the differences between these optical currents are calculated in units of respective subcarriers as is the case where there is no chromatic dispersion, there is a possibility that some subcarrier components with the same frequencies cancel each other because the signs of their phase rotations owing to the dispersion are opposite. Therefore, in a system in which the chromatic dispersion is not negligible, it is effective that the subtraction is performed after the phase rotations owing to the chromatic dispersion are made to cancel each other in the units of the subcarriers. The configuration used for this processing is shown in FIG. 10. In FIG. 10, phase rotation units 250 and 260 are signal processing units for canceling the phase rotations owing to the chromatic dispersion in the units of the subcarriers, and the signs of the phase rotations respectively applied to the phase rotation units 250 and 260 are opposite to each other.

2. Second Embodiment

Figure 15:
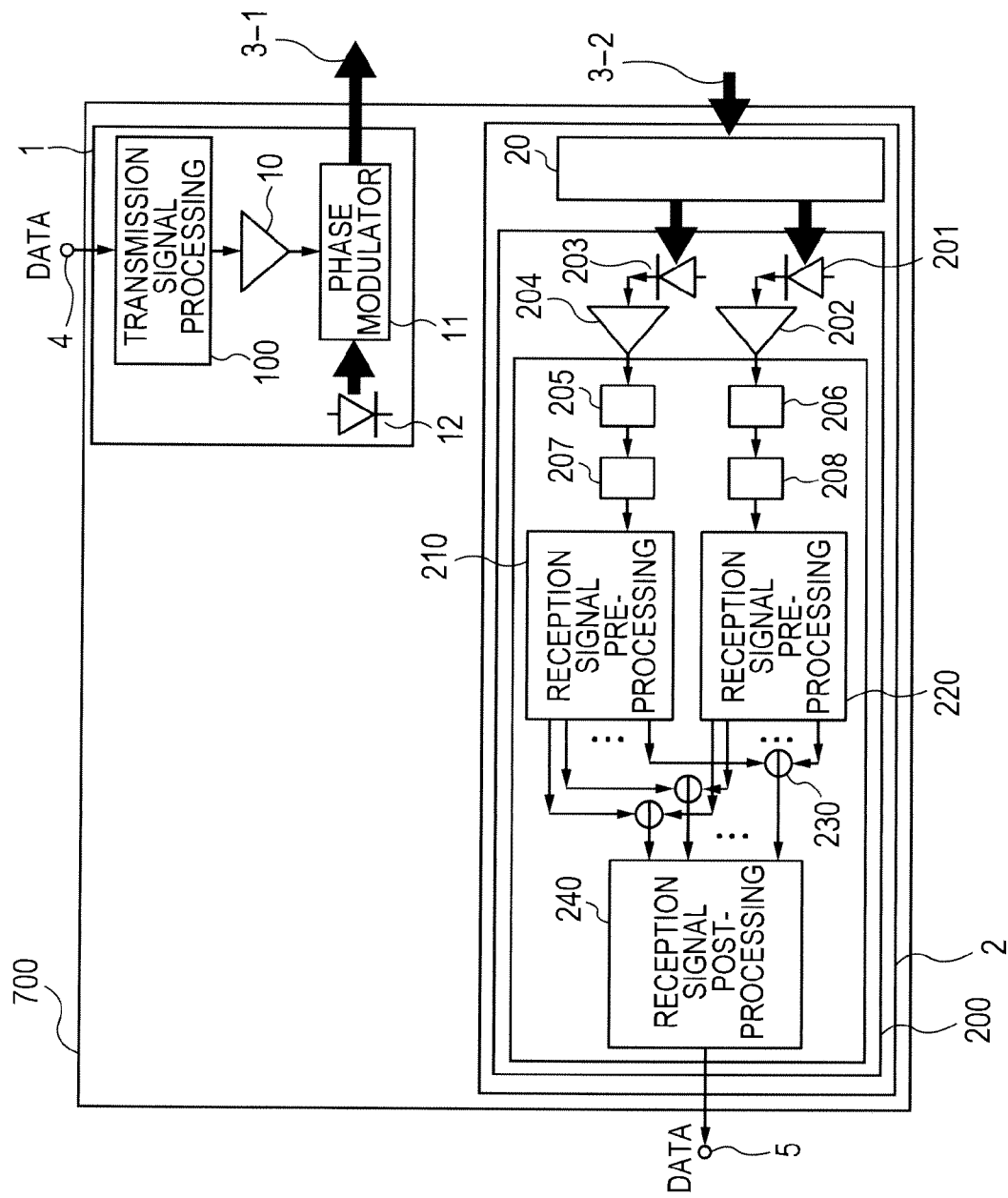
FIG. 15 is a functional block diagram of an optical transponder according to a sixth embodiment.

An optical transponder according to a second embodiment will be described with reference to FIG. 15. This optical transponder is a device including an optical transmitter 1 and an optical receiver 2 mounted on a chassis or on a board. Therefore, the optical transponder includes two optical fibers 3-1 and 3-2. The optical fiber 3-1 is used for transmitting optical signals, and the optical fiber 3-2 is used for receiving optical signals. As the optical transmitter 1 and the optical receiver 2 of an optical transponder 700, those used in the above described embodiments can be used accordingly. To put it concretely, although the optical transmitter and the optical receiver shown in FIG. 1 are used in FIG. 15, any one of the optical receivers 2 shown in FIGS. 6, 7, 8 and 10 can be used as the optical receiver.

3. Third Embodiment

Figure 16:
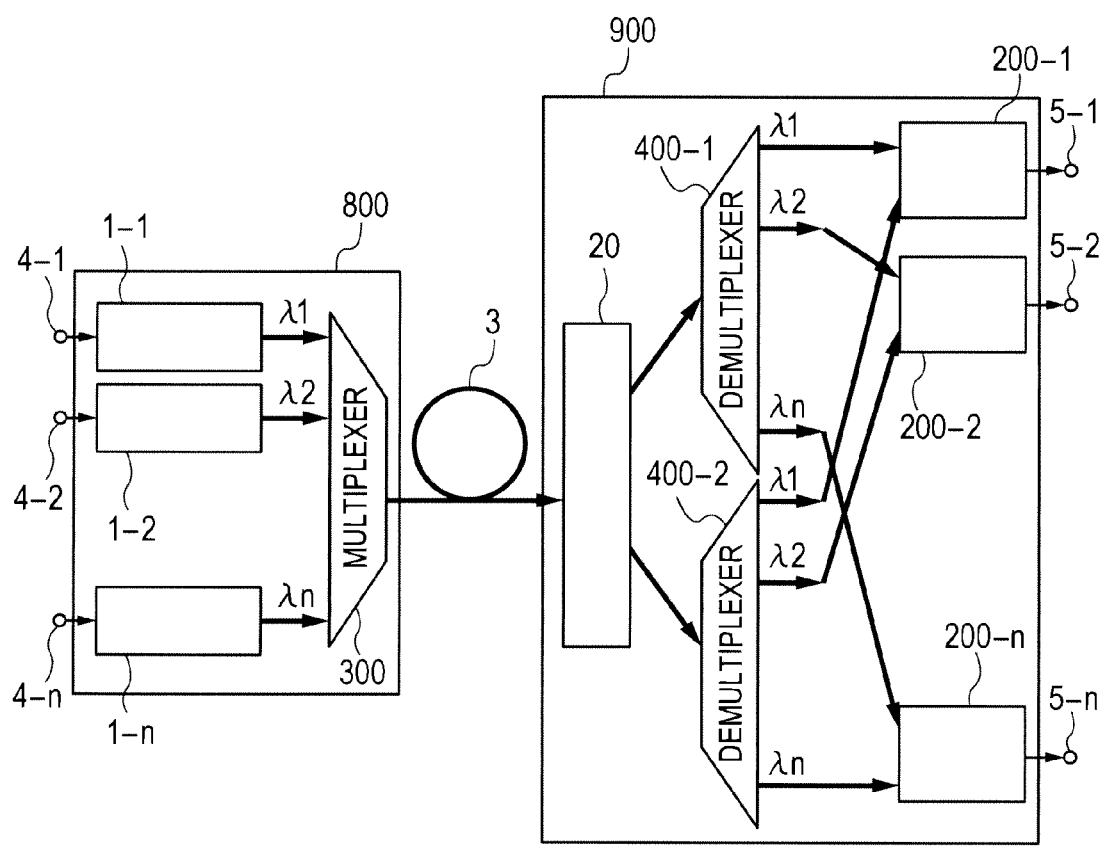
FIG. 16 is a functional block diagram of a wavelength multiplexing communication system according to a seventh embodiment.
Figure 17:
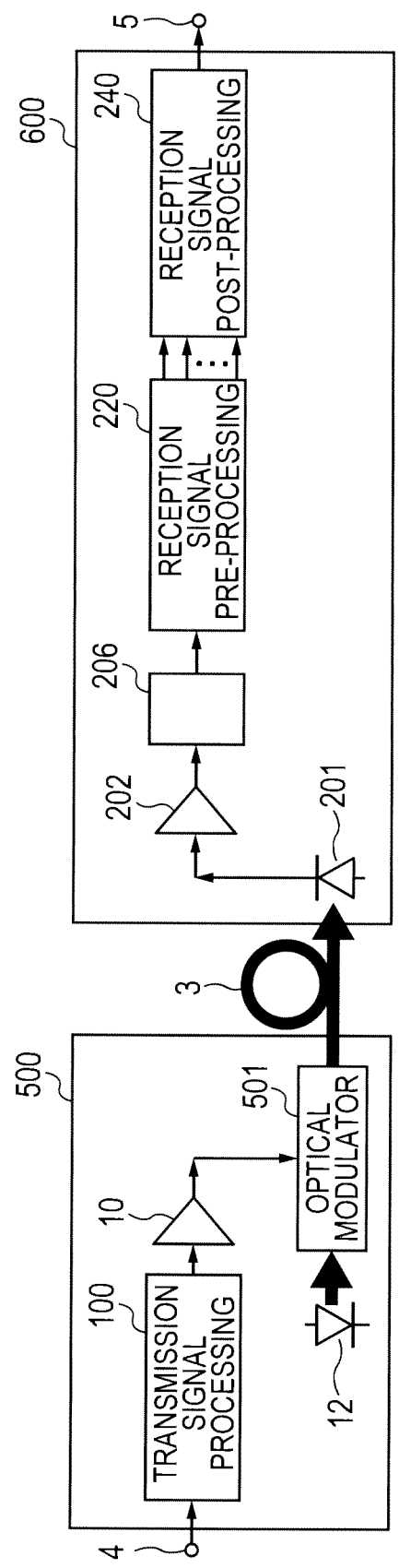
FIG. 17 is a functional block diagram of an existing optical OFDM communication system.

A third embodiment will be described with reference to FIG. 16. FIG. 16 is a block diagram of the entirety of a wavelength multiplexing communication system according to a third embodiment. This system is an optical communication system in which plural digital information signals are converted to wavelength multiplexing signals by a wavelength multiplexing transmitting device 800; these wavelength multiplexing signals are transmitted to a wavelength multiplexing receiving device 900 via an optical fiber 3 which is a transmission path; and the plural original digital signals are restored. The wavelength multiplexing transmitting device receives the plural digital information signals from input terminals 4-$i$ ($i=1, 2, \ldots, n$). The received digital signals are respectively converted to optical signals phase-modulated by optical transmitters 1-$i$ ($i=1, 2, \ldots, n$). The wavelengths of the optical signals output from the optical transmitters 1-$i$ ($i=1, 2, \ldots, n$) are respectively $\lambda 1, \lambda 2, \ldots, \lambda n$ that are different from each other, and the configuration of the optical transmitters 1-$i$ ($i$=1, 2, ..., n) are the same as that of the optical transmitter described in the first embodiment. In other words, each of the optical transmitters 1-$i$ is the optical transmitter 1 shown in FIG. 1. Output lights from the optical transmitters 1 are wavelength-multiplexed by an optical multiplexer 300, and sent to the optical fiber 3 which is a propagation path from the wavelength multiplexing transmitting device 800 as a wavelength multiplexing optical signal.

The wavelength multiplexing optical signal that passes along the optical fiber 3 which is a propagation path enters the wavelength multiplexing receiving device 900.

The wavelength multiplexing receiving device 900 includes a delay interferometer 20, two optical demultiplexers 400-1 and 400-2, and balanced optical receiving units 200-$i$ ($i$=1, 2, ..., n). The delay interferometer 20 has a configuration shown in FIG. 5. FIG. 13 shows the transmittance of the delay interferometer, and output powers from two output ports respectively show frequency dependencies given by the next expression.

[Expression 32]

$$P(f) = \frac{P_0}{2} \cdot \{1 \pm \cos(2\pi \cdot f \cdot \tau)\}$$

In other words, the output powers respectively show periodic frequency dependencies. Here, by utilizing this periodicity, it is possible to make each of the optical frequencies of the optical transmitters, $f_1$ (=c/$\lambda$1), $f_2$ (=c/$\lambda$2), ..., $f_n$ (=c/$\lambda$n), to have the same relationship as $f_c$ shown by Equation (6) has. Here, c is the light speed. For example, an optical frequency interval of a wavelength multiplexing signal is typically 50 GHz, or 100 GHz. In this case, if only even numbers are used as m, or only odd numbers are used as m in Equation (6), the delay times in the delay interferometer 20 are respectively 20 picoseconds and 10 picoseconds. In the case where even numbers and odd numbers are used together as m, the delay times in the delay interferometer 20 are respectively 10 picoseconds and 5 picoseconds.

In addition, if Equations (11) and (12) are almost satisfied, the carrier lights with the wavelengths of the wavelength multiplexing signals along with the upper sidebands and the carrier lights with the wavelengths of the wavelength multiplexing signals along with the lower sidebands are respectively output from the two output ports of the delay interferometer 20. In other words, the intensity-modulated optical lights with individual wavelengths are output in the form of being wavelength-multiplexed.

These two intensity-modulated wavelength multiplexing signals are respectively demultiplexed by the optical demultiplexers 400-1 and 400-2 into intensity-modulated optical signals in units of respective wavelengths. Two lights with the same wavelength among the output lights from the two optical demultiplexers 400-1 and 4002 are respectively composed of a carrier light and an upper sideband, and a carrier light and a lower sideband. These lights are equal to lights having anyone of the optical frequencies of the optical transmitters, $f_1$ (=c/$\lambda$1), $f_2$ (=c/$\lambda$2), ..., and $f_n$ (=c/$\lambda$n). Output optical signals from the optical demultiplexers 400-1 and 4002 that have the same wavelength $\lambda i$ ($i$=1, 2, ..., n) are made to enter the balanced optical receiving unit 200-$i$ ($i$=1, 2, ..., n). As the balanced optical receiving unit 200-$i$ ($i$=1, 2, ..., n), a suitable balanced optical receiving unit used in the first embodiment can be used. To put it concretely, any one of the balanced optical receiving units 200 shown in FIGS. 1, 6, 7, 8 and 10 can be used. The balanced optical receiving unit 200-$i$ ($i$=1, 2, ..., n) demodulates the received optical lights, and sends out the demodulated information data from output terminal 5-$i$ ($i$=1, 2, ..., n) respectively.

Figure 18:
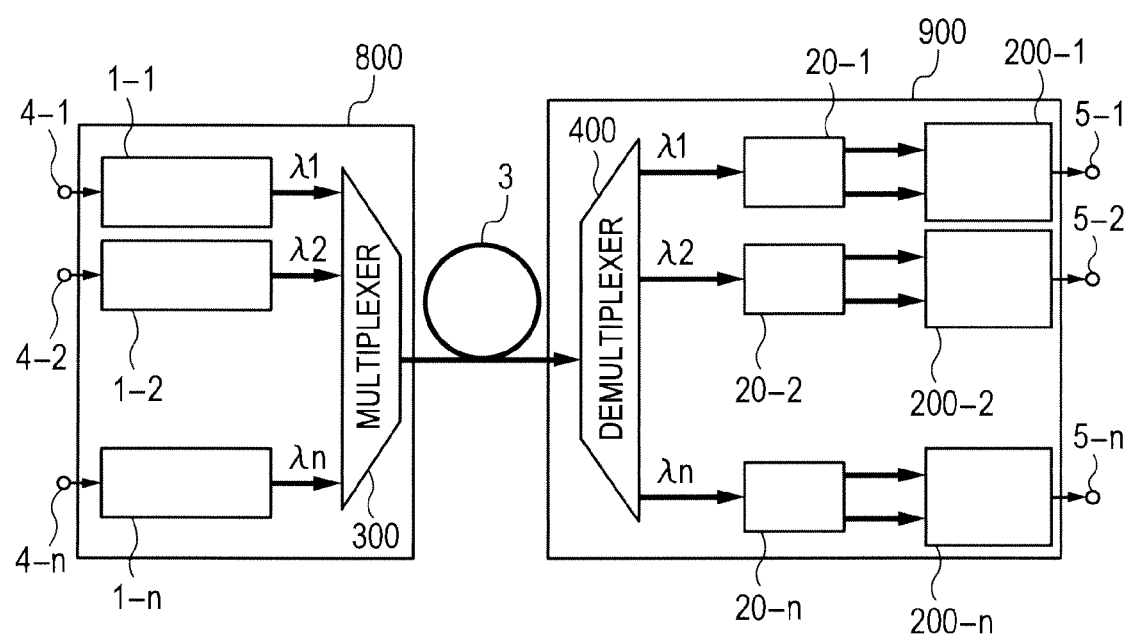
FIG. 18 is a functional block diagram of a wavelength multiplexing communication system.

The above is the description about the wavelength multiplexing communication system according to the third embodiment. It goes without saying that a wavelength multiplexing communication system can be configured by preparing plural transmitters and receivers that are used for the first embodiment and that are used for different wavelengths; and by preparing multiplexers and demultiplexers that respectively multiplex and demultiplex signals (in this case, the configuration of the wavelength multiplexing communication system becomes as shown in FIG. 18).

Although the above description of the wavelength multiplexing communication system according to the third embodiment has been made under the assumption that the wavelength multiplexing transmitting device 800 and the wavelength multiplexing receiving device 900 are separate devices, it goes without saying that an alternative embodiment in which the functions of both wavelength multiplexing transmitting device and wavelength multiplexing receiving device are implemented in the same wavelength multiplexing device is conceivable. In addition, it goes without saying that there is a wavelength multiplexing communication system according to another embodiment in which a so-called transponder, which has optical transmitters 1-$i$ ($i$=1, 2, ..., n) and balanced optical receiving units 200-1 ($i$=1, 2, ..., n) mounted on the same chassis or on the same board.

INDUSTRIAL APPLICABILITY

The present invention can be applied to, for example, optical communication systems.

| List of Reference Signs | |
| --- | --- |
| 1, 1-1, 1-2, 1-n, 500: | Optical Transmitter |
| 2: | Optical Receiver |
| 3, 3-1, 3-2: | Optical Fiber |
| 4, 4-1, 4-2, 4-n: | Input Terminal |
| 5, 5-1, 5-2, 5-n: | Output Terminal |
| 10: | Driver Amplifier |
| 11: | Phase Modulator |
| 12: | Laser |
| 20, 20-1, 20-2, 20-n: | Delay Interferometer |
| 21, 22: | Photocoupler |
| 100: | Transmission Signal Processing Unit |
| 110, 212: | Serial-Parallel (S/P) Converter |
| 120: | Subcarrier Modulation Unit |
| 130: | Inverse Fast Fourier Transform (FFT) Unit |
| 140, 242: | Parallel-Serial (P/S) Converter |
| 150: | Digital-Analog (D/A) Converter |
| 200, 200-1, 200-2, 200-n: | Balanced Optical Receiving Unit |
| 201, 203: | Photodiode |
| 201-1: | Balanced Photodiode |
| 201, 204: | Preamplifier |
| 204-1: | Differential Preamplifier |
| 205, 206: | Analog-Digital (A/D) Converter |
| 207, 208: | Phase Extraction Unit |
| 209: | Optical Front-End Unit |
| 210, 220: | Reception Signal Pre-Processing Unit |
| 213: | Fast Fourier Transform (FFT) Unit |
| 214: | Phase Rotation Unit |
| 230: | Subtraction Unit |
| 240: | Reception Signal Post-Processing Unit |
| 241: | Subcarrier Demodulation Unit |
| 250, 260: | Phase Rotation Unit |
| 300: | Optical Multiplexer |
| 400-1, 400-2: | Optical Demultiplexer |
| 501: | Optical Modulator |

-continued

| List of Reference Signs | |
|---|---|
| 600: | Direct Detection Optical Receiver |
| 700: | Optical Transponder |
| 800: | Wavelength Multiplexing Transmitting Device |
| 900: | Wavelength Multiplexing Receiving Device |

The invention claimed is:

1. A optical communication system comprising:
an optical transmitter that modulates a plurality of subcarriers orthogonal to each other by mapping digital data to the plurality of subcarriers over a symbol time, and transmits the modulated subcarriers via an optical fiber as optical signals; and
an optical receiver that photoelectrically converts the optical signals that are propagated along the optical fiber, decodes the subcarrier signals, and regenerates the original digital signals, wherein
the optical transmitter includes:
a transmission signal processing unit that modulates a plurality of subcarriers orthogonal to each other by mapping digital data to the plurality of subcarriers over a symbol time, and performs inverse fast Fourier transform on the modulated subcarrier signals to generate a real base-band OFDM signal; and
a phase modulator that phase-modulates light from a light source with the real base-band OFDM signal and sends out the phase-modulated light, and
the optical receiver includes:
a delay interferometer that converts the phase-modulated optical signal that is sent from the optical transmitter via the optical fiber to two intensity-modulated optical signals;
two photoelectric converters that convert the two intensity-modulated optical signals to electrical signals;
two AD converters that respectively A/D convert the outputs sent from the two photoelectric converters;
two phase extraction units that respectively extract phases from the outputs of the two AD converters;
two reception signal pre-processing units that respectively perform FFT transform on the outputs of the two phase extraction units, and respectively obtain subcarrier signals;
a subtraction unit that calculates the differences between subcarrier signals having the same frequencies about all the subcarrier signals output from the two reception signal pre-processing units; and
a reception signal post-processing unit that demodulates the outputs of the subtraction unit in units of respective subcarriers to obtain data, and regenerates the original digital data from the obtained data.

2. The optical communication system according to claim 1, wherein the delay time $\tau$ of the delay interferometer and the center frequency $f_c$ of the transmission light satisfy the relationship $2\pi f_c \tau = 2n\pi \pm \pi/2$ (wherein n is an integer).

3. The optical communication system according to claim 2, wherein the delay time $\tau$ of the delay interferometer and the center frequency $f_s$ of the OFDM signal approximately satisfy the relationship $2\pi f_s \tau = n\pi/2$ (wherein n is a positive odd integer).

4. The optical communication system according to claim 1, wherein the center frequency $f_s$ of the OFDM signal and the bandwidth B of the OFDM signal approximately satisfy the relationship $f_s \tau > 1.5B$.

5. The optical communication system according to claim 1, further comprising two phase rotation units that, after canceling the phase rotations owing to the chromatic dispersion to which the subcarrier signals sent from the two reception signal pre-processing units are subject, output the subcarrier signals to the subtraction unit.

6. The optical communication system according to claim 5, wherein the signs of the phase rotations respectively applied to the two phase rotation units are opposite to each other.

7. An optical receiver used for an optical communication system, the optical communication system comprising: an optical transmitter that modulates a plurality of subcarriers orthogonal to each other by mapping digital data to the plurality of subcarriers over a symbol time, performs inverse fast Fourier transform on the modulated subcarrier signals to generate a real base-band OFDM signal, phase-modulates light from a light source with the real base-band OFDM signal, and sends out the phase-modulated light; and an optical receiver that photoelectrically converts the optical signals that are propagated along a optical fiber, decodes the subcarrier signals, and regenerates the original digital signals, wherein
the optical receiver includes:
a delay interferometer that converts the phase-modulated optical signal that is sent from the optical transmitter via the optical fiber to two intensity-modulated optical signals;
two photoelectric converters that convert the two intensity-modulated optical signals to electrical signals;
two AD converters that respectively A/D convert the outputs sent from the two photoelectric converters;
two phase extraction units that respectively extract phases from the outputs of the two AD converters;
two reception signal pre-processing units that respectively perform FFT transform on the outputs of the two phase extraction units, and respectively obtain subcarrier signals;
a subtraction unit that calculates the differences between subcarrier signals having the same frequencies about all the subcarrier signals output from the two reception signal pre-processing units; and
a reception signal post-processing unit that demodulates the outputs of the subtraction unit in units of respective subcarriers to obtain data, and regenerates the original digital data from the obtained data.

8. An optical transponder comprising:
a transmitting unit including
a transmission signal processing unit that modulates a plurality of subcarriers orthogonal to each other by mapping digital data to the plurality of subcarriers over a symbol time, and performs inverse fast Fourier transform on the modulated subcarrier signals to generate a real base-band OFDM signal, and
a phase modulator that phase-modulates light from a light source with the real base-band OFDM signal and sends out the phase-modulated light; and
a receiving unit including
a delay interferometer that converts the phase-modulated optical signal that is sent from the optical transmitter via an optical fiber to two intensity-modulated optical signals,
two photoelectric converters that convert the two intensity-modulated optical signals to electrical signals,
two AD converters that respectively A/D convert the outputs sent from the two photoelectric converters,
two phase extraction units that respectively extract phases from the outputs of the two AD converters, two reception signal pre-processing units that respectively perform FFT transform on the outputs of the two phase extraction units, and respectively obtain subcarrier signals, a subtraction unit that calculates the differences between subcarrier signals having the same frequencies about all the subcarrier signals output from the two reception signal pre-processing units, and a reception signal post-processing unit that demodulates the outputs of the subtraction unit in units of respective subcarriers to obtain data, and regenerates the original digital data from the obtained data.

9. A wavelength multiplexing communication system comprising:

a wavelength multiplexing transmitting device that transmits a wavelength multiplexing optical signal that is obtained by multiplexing a plurality of optical signals with different wavelengths; and a wavelength multiplexing receiving device that demultiplexes the wavelength multiplexing optical signal received via an optical fiber into optical signals in units of respective wavelengths, and receives the demultiplexed optical signals, wherein the wavelength multiplexing transmitting device includes:
a plurality of optical transmitters; and
an optical multiplexer that multiplexes the output lights of the plurality of optical transmitters, and outputs the wavelength multiplexing optical signal, wherein
each of the plurality of optical transmitters includes
a light source with a wavelength different from the wavelengths of light sources of other optical transmitters,
a transmission signal processing unit that modulates a plurality of subcarriers orthogonal to each other by mapping digital data to the plurality of subcarriers over a symbol time, and performs inverse fast Fourier transform on the modulated subcarrier signals to generate a real base-band OFDM signal, and
a phase modulator that phase-modulates light from the light source with the real base-band OFDM signal and outputs the phase-modulated light, and the wavelength multiplexing receiving device includes:
a delay interferometer that converts the wavelength multiplexing optical signal that is sent from the wavelength multiplexing transmitting device via the optical fiber to two intensity-modulated wavelength multiplexing optical signals;

two optical demultiplexers that demultiplexes the two intensity-modulated wavelength multiplexing optical signals into optical signals in units of respective wavelengths; and a plurality of optical receivers each of which receives two demultiplexed optical signals having the same wavelength among the demultiplexed optical signals, wherein each of the plurality of optical receivers respectively includes
two photoelectric converters that convert the two intensity-modulated optical signals with corresponding wavelength to electrical signals,
two AD converters that respectively A/D convert the outputs sent from the two photoelectric converters,
two phase extraction units that respectively extract phases from the outputs of the two AD converters,
two reception signal pre-processing units that respectively perform FFT transform on the outputs of the two phase extraction units, and respectively obtain subcarrier signals,
a subtraction unit that calculates the differences between subcarrier signals having the same frequencies about all the subcarrier signals output from the two reception signal pre-processing units, and
a reception signal post-processing unit that demodulates the outputs of the subtraction unit in units of respective subcarriers to obtain data, and regenerates the original digital data from the obtained data.

10. A wavelength multiplexing receiving device used for a wavelength multiplexing communication system, the wavelength multiplexing communication system comprising:

a wavelength multiplexing transmitting device that modulates a plurality of subcarriers orthogonal to each other by mapping digital data to the plurality of subcarriers over a symbol time, performs inverse fast Fourier transform on the modulated subcarrier signals to generate a real base-band OFDM signal, multiplexes output lights sent from a plurality of optical transmitters that phase-modulate lights from light sources with the real base-band OFDM signal, and transmits the wavelength multiplexed optical signal; and a wavelength multiplexing receiving device that demultiplexes the wavelength multiplexing optical signal sent via an optical fiber into optical signals in units of respective wavelengths, and receives the demultiplexed optical signals, wherein the wavelength multiplexing receiving device includes:
a delay interferometer that converts the wavelength multiplexing optical signal that is sent from the wavelength multiplexing transmitting device via the optical fiber to two intensity-modulated wavelength multiplexing optical signals;

two optical demultiplexers that demultiplexes the two intensity-modulated wavelength multiplexing optical signals into optical signals in units of respective wavelengths; and a plurality of optical receivers each of which receives two demultiplexed optical signals having the same wavelength among the demultiplexed optical signals (a plurality of optical receivers each of which receives two demultiplexed optical signals having the same wavelength among the demultiplexed optical signals so that all the demultiplexed optical signals are received by the plurality of optical receivers), wherein each of the plurality of optical receivers respectively includes
two photoelectric converters that convert the two intensity-modulated optical signals with corresponding wavelength to electrical signals,
two AD converters that respectively A/D convert the outputs sent from the two photoelectric converters,
two phase extraction units that respectively extract phases from the outputs of the two AD converters,
two reception signal pre-processing units that respectively perform FFT transform on the outputs of the two phase extraction units, and respectively obtain subcarrier signals,
a subtraction unit that calculates the differences between subcarrier signals having the same frequencies about all the subcarrier signals output from the two reception signal pre-processing units, and a reception signal post-processing unit that demodulates the outputs of the subtraction unit in units of respective subcarriers to obtain data, and regenerates the original digital data from the obtained data.

11. A wavelength multiplexing optical transponder comprising a wavelength multiplexing transmitting unit and a wavelength multiplexing receiving unit, wherein, the wavelength multiplexing transmitting unit includes:
a plurality of optical transmitters; and
an optical multiplexer that multiplexes the output lights of the plurality of optical transmitters, and outputs the wavelength multiplexing optical signal to an optical fiber, wherein
each of the plurality of optical transmitters includes
a light source with a wavelength different from the wavelengths of light sources of other optical transmitters,
a transmission signal processing unit that modulates a plurality of subcarriers orthogonal to each other by mapping digital data to the plurality of subcarriers over a symbol time, and performs inverse fast Fourier transform on the modulated subcarrier signals to generate a real base-band OFDM signal, and
a phase modulator that phase-modulates light from a light source with the real base-band OFDM signal and outputs the phase-modulated light; and the wavelength multiplexing receiving unit includes:
a delay interferometer that converts the wavelength multiplexing optical signal that is sent via an optical fiber to two intensity-modulated wavelength multiplexing optical signals;
two optical demultiplexers that demultiplexes the two intensity-modulated wavelength multiplexing optical signals into optical signals in units of respective wavelengths; and
a plurality of optical receivers each of which receives two demultiplexed optical signals having the same wavelength among the demultiplexed optical signals, wherein
each of the plurality of optical receivers respectively includes
two photoelectric converters that respectively convert the two intensity-modulated optical signals with corresponding wavelength to electrical signals,
two AD converters that respectively A/D convert the outputs sent from the two photoelectric converters,
two phase extraction units that respectively extract phases from the outputs of the two AD converters,
two reception signal pre-processing units that respectively perform FFT transform on the outputs of the two phase extraction units, and respectively obtain subcarrier signals,
a subtraction unit that calculates the differences between subcarrier signals having the same frequencies about all the subcarrier signals output from the two reception signal pre-processing units, and
a reception signal post-processing unit that demodulates the outputs of the subtraction unit in units of respective subcarriers to obtain data, and regenerates the original digital data from the obtained data.

12. A optical communication system comprising:
an optical transmitter that modulates a plurality of subcarriers orthogonal to each other by mapping digital data to the plurality of subcarriers over a symbol time, and transmits the modulated subcarriers via an optical fiber as optical signals; and
an optical receiver that photoelectrically converts the optical signals that are propagated along the optical fiber, decodes the subcarrier signals, and regenerates the original digital signals, wherein the optical transmitter includes:
a transmission signal processing unit that modulates a plurality of subcarriers orthogonal to each other by mapping digital data to the plurality of subcarriers over a symbol time, and performs inverse fast Fourier transform on the modulated subcarrier signals to generate a real base-band OFDM signal; and
a phase modulator that phase-modulates light from a light source with the real base-band OFDM signal and sends out the phase-modulated light, and the optical receiver includes:
a delay interferometer that converts the phase-modulated optical signal that is sent from the optical transmitter via the optical fiber to two intensity-modulated optical signals;
a photoelectric converter that converts the optical signals to electrical signals;
an AD converter that A/D converts the converted electrical signals;
a phase extraction unit that extracts phase components from the signals converted by the AD converter;
a reception signal pre-processing unit that performs FFT transform on the extracted phase components, and obtains subcarrier signals;
a reception signal post-processing unit that demodulates data in units of respective subcarriers, and regenerates the original digital data from the demodulated data; and
a subtraction unit that calculates the difference between two signals corresponding to the two optical signals sent from the delay interferometer before the processing performed by the reception signal post-processing unit.

13. The optical communication system according to claim 12, wherein the optical receiver includes two above-described photoelectric converters, two above-described AD converters, and two above-described phase extraction units; wherein
the two photoelectric respectively converters convert two optical signals sent from the delay interferometer to electrical signals;
the two AD converters respectively A/D convert the outputs sent from the two photoelectric converters;
the two phase extraction units respectively extract phases from the outputs of the two AD converters;
the subtraction unit calculates the difference between the outputs of the two phase extraction units, and outputs the difference to the reception signal pre-processing unit.

14. The optical communication system according to claim 12, wherein the optical receiver includes two above-described photoelectric converters and two above-described AD converters, wherein
the two photoelectric converters converts two optical signals sent from the delay interferometer to electrical signals;
the two AD converters respectively A/D convert the outputs sent from the two photoelectric converters;
the subtraction unit calculates the difference between the outputs of the two AD converters, and outputs the difference to the phase extraction unit.

15. The optical communication system according to claim 12, wherein the subtraction to calculate the difference between signals corresponding to the two optical signals sent from the delay interferometer is done in an inner section of an optical front-end unit including the photoelectric converter and the subtraction unit.

* * * * *